IGOR J. KARASSIK
JOSEPH F. SEBALD
INVENTORS

Jan. 3, 1967     I. J. KARASSIK ETAL     3,296,122
SUPPLY OF FRESH UNPOLLUTED WATER BY MEANS OF
PASTEURIZATION AND STERILIZATION
OF SEWAGE EFFLUENT
Filed April 2, 1963     16 Sheets-Sheet 8

IGOR J. KARASSIK
JOSEPH F. SEBALD
*INVENTORS*

BY Daniel H. Bohis

Atty

IGOR J. KARASSIK
JOSEPH F. SEBALD
INVENTORS

IGOR J. KARASSIK
JOSEPH F. SEBALD
INVENTORS

IGOR J. KARASSIK
JOSEPH F. SEBALD
INVENTORS

Jan. 3, 1967    I. J. KARASSIK ETAL    3,296,122
SUPPLY OF FRESH UNPOLLUTED WATER BY MEANS OF
PASTEURIZATION AND STERILIZATION
OF SEWAGE EFFLUENT
Filed April 2, 1963    16 Sheets-Sheet 15

IGOR J. KARASSIK
JOSEPH F. SEBALD
INVENTORS

BY Daniel H. Bobis
atty

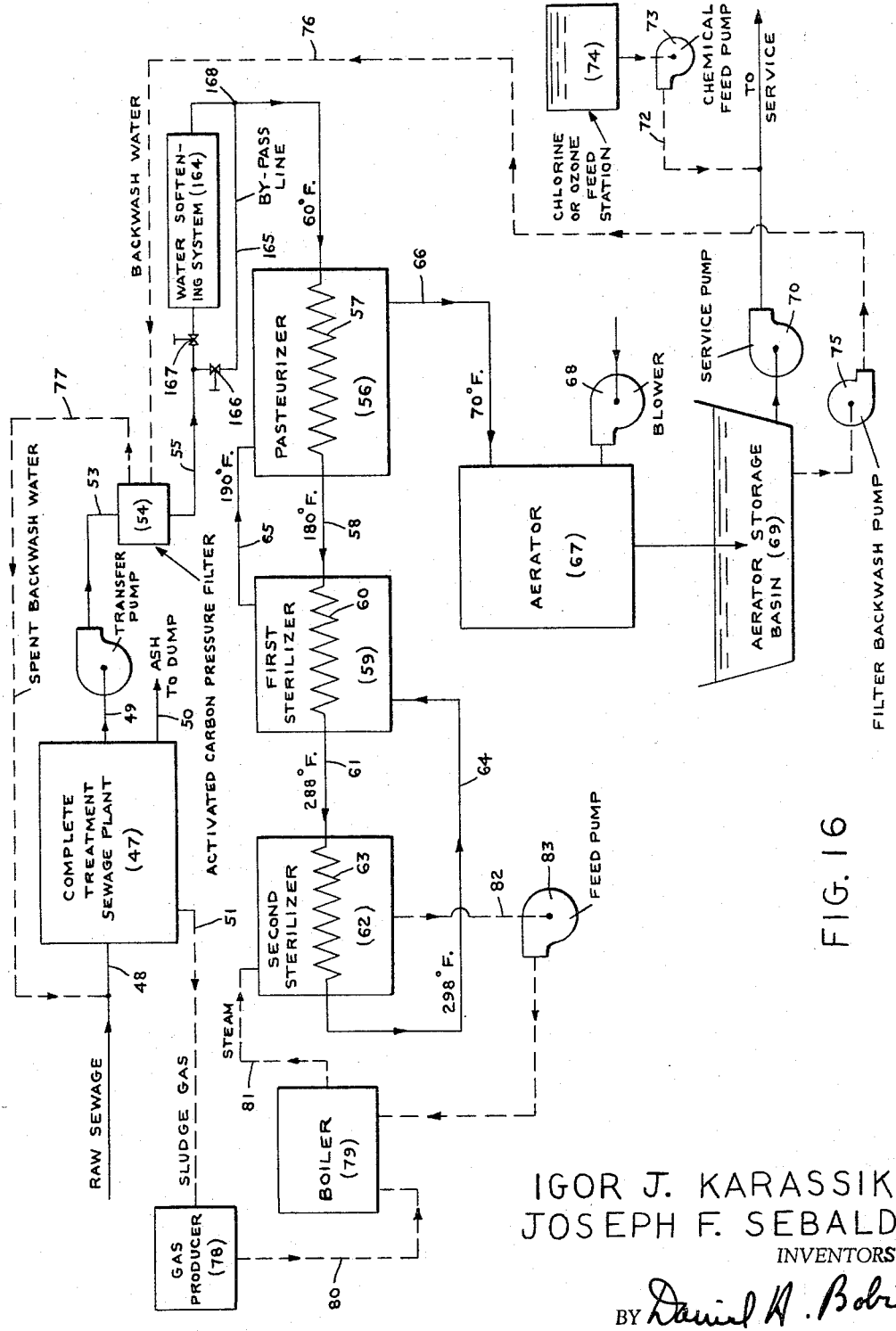

United States Patent Office 3,296,122
Patented Jan. 3, 1967

3,296,122
SUPPLY OF FRESH UNPOLLUTED WATER BY MEANS OF PASTEURIZATION AND STERILIZATION OF SEWAGE EFFLUENT
Igor J. Karassik, Maplewood, and Joseph F. Sebald, Bloomfield, N.J., assignors to Worthington Corporation, Harrison, N.J., a corporation of Delaware
Filed Apr. 2, 1963, Ser. No. 269,982
29 Claims. (Cl. 210—2)

This invention relates to purification systems for providing a potable water supply, and, more specifically, to a process and apparatus for providing fresh and unpolluted water in areas where such supply cannot be obtained by conventional means, such as rivers, lakes, reservoirs and the underground water table. The process and apparatus of the invention is capable of creating a supply of fresh, unpolluated water from raw sewage, or from water containing such a high quantity of raw sewage and other contaminants that it is normally unusable as a source for a potable water supply.

It is clearly recognized that fresh water is preeminently necessary to the maintenance and growth of human civilization. However, governmental authorities, scientists, and other technical personnel concerned with the problems of providing such water supplies, have come to realize that a grave threat exists to our civilization because of a potentially catastrophic discrepancy between the need for fresh water and its availability.

The severity of this threat has been accented by certain serious problems arising particularly in the relatively dry western States where controversies have often arisen between authorities or State governments over the control and disposal of the entire output of certain relatively scarce streams and rivers. In some cases, the demand for water has become considerably greater than the quantity furnished by a given source. The result has been the necessity for careful and controlled rationing of the entire supply, and, in some cases, the curtailment of certain programs involving the use of water, such as irrigation.

Several factors have united to create the above noted discrepancy between the need for fresh water and its availability. Some of the more important of these are as follows:

(1) The explosive growth of the world's population.
(2) The growth of industrial production which requires fresh water in vast quantities.
(3) The increasing pollution of ground and surface water, which has become characteristic of nearly all heavily populated watersheds.
(4) The depletion of ground water and the lowering of the water table, which often has invited an inflow of saline waters capable of contaminating fresh water sources far inland.

These problems have been attacked in several ways so as to remedy the scarcity of fresh water. These are as follows:

(1) The usable supply in a given area has been increased by reducing losses of flood water by the use of storage reservoirs and by an intelligent approach to the reforestation and cultivation of watersheds.
(2) The quality of the available water has been improved by the elimination or reduction of pollution.
(3) Industry has been encouraged to institute conservation measures in their industrial processes so as to reduce their requirements for fresh water, and, in many areas, industries have been required to control their waste disposal so as to not pollute water supplies.
(4) Water has been re-routed by means of pipelines and aqueducts from oversupplied areas to areas where definite shortages occur.
(5) Conversion plants may be established whereby salt water in coastal areas and brackish water in inland areas may be converted to fresh, potable water.
(6) Water normally considered waste water has been made reusable by proper treatment to remove contaminants.

The first four means are being constantly explored and used by the Federal, State or municipal governments. While all four means are clearly helpful, they cannot be counted upon in themselves to solve all of our potential shortages, and, in particular, they are not applicable in all areas, often involving such extensive planning and such extreme costs that they do not provide a practical solution.

Much attention has been and is being directed at the present time to the fifth means noted above, namely, the conversion of salt and brackish water to fresh water by some energy means. It is highly probable that major advances along this line will make this solution quite an effective one in many cases and in many areas. However, all indications lead to the conclusion that except for certain special situations where the cost of fresh water becomes secondary to the fact that it is being made available, conversion of saline and brackish waters will be too expensive for large scale supplies, short of a real crisis situation.

The present invention has for its object the application of the sixth and last means mentioned above, namely, making water reusable by proper treatment to remove contaminants and thus providing a source of fresh water more economically than by other known means. It has become increasingly impractical to dump raw sewage into inland rivers and coastal waters, and, in most areas, legislation exists controlling the degree of pollution permissible by the disposal of sewage and waste into existing bodies of water. The required degree of treatment to avoid pollution for a particular community depends upon the local stream flow and the degree of pollution of the sewage discharge. Small towns situated along large rivers usually need only the minimum degree of sewage treatment, and, conversely, large cities on relatively small rivers often require the maximum degree of treatment. Various degrees of sewage treatment are obtainable with several processes or methods now in use. It is common practice to classify these methods into three general groupings, namely, partial, intermediate, and complete treatment.

The treatment of municipal sewage comprises four major functions, as follows:

(1) To remove suspended solid matter from the raw sewage;
(2) To stabilize the remaining organic matter by oxidization;
(3) To disinfect the treated sewage for bacterial reduction; and
(4) To disposed of the accumulated putrescible sludge inoffensively and, if possible, with some benefit.

The overall performance of sewage treatment plants is measured principally by (1) the relative degree of removal of suspended solids, and (2) the relative degree of reduction of biochemical oxygen demand. This last is the measure of the oxygen required to maintain the functioning of bacterial life in the process of decomposition. By such biological action, the putrescible organic compounds are reduced to stable, inoffensive products.

The comparative performances of the various processes as included in the three principal types of sewage treatment cover the following broad ranges:

| Type of Treatment | Removal of Suspended Solids (percent) | Reduction in B.O.D. (percent) |
|---|---|---|
| Partial | 20–60 | 25–50 |
| Intermediate | 60–80 | 60–75 |
| Complete | 80–90 | 80–95 |

As a result of the rapid expansion of the population and the resultant increase in the potential contamination of the receiving waters into which sewage effluent is disposed, there has been and will continue to be a constant increase in the percentage of sewage disposal installations which provide complete treatment of the sewage.

Considerable interest has arisen, therefore, in the possibility of utilizing the raw sewage as an additional source of fresh water. There are already a number of installations where the effluent from complete treatment sewage plants is being used as a source of water for industrial processes. On the other hand, the use of this effluent as a source of potable water is both psychlogically repugnant to most people and actually is not quite practical since it may still harbor a residue of bacterial life which would be harmful to human beings. In evaluating this repugnance and this potential danger, however, it must be relized that the effluent is generally discharged into rivers which, in turn, serve as sources of potable water for cities downstream from the point of effluent disposal. It follows, therefore, that the degree to which this effluent is further purified depends primarily on the proportion of effluent to the total river flow, on the distance between effluent disposal and the source of supply for the next city. Thus, it is practically true that in a number of cases, the source of supply of fresh water for a city may appear to be satisfactory while actually containing contaminants of an undesirable character and to an undesirable amount.

It is an object of this invention, therefore to provide a process and apparatus for utilizing as a source of fresh water the fluids from raw sewage, or water from a downstream source which is so heavily contaminated that it is not normally usable as a source of potable water, while, at the same time, eliminating any possibility of danger from the presence of bacteria or other harmful micro-organisms and eliminating any possible repugnance against the use of treated sewage effluent as a source of potable water.

A further object of the invention is to provide further treatment of the effluent of a complete treatment sewage plant so as to pasteurize, sterilize and aerate the effluent, rendering it suitable for use as potable water.

The basic principle of pasteurization is well known in the art, it being used widely in the conservation of such products as milk, beer, fruit juices, cheeses and the like. The process consists in raising the temperature of the product being pasteurized to a level sufficiently high to destroy bacteria present in the product. In the case of milk, for example, two processes are currently in use. In one of these, milk is heated to 145° F.–150° F. and held at that temperature for thirty minutes; in the other, it is raised quickly to 161° F. for about fifteen seconds. A somewhat higher temperature would be more effective, but it would have unfavorable effects on the milk itself. This limitation, however, need not apply to water, and it is an object of the present invention, therefore, to apply pasteurization to the effluent of the complete treatment sewage plant wherein the process is carried out at somewhere near 180° F.

Whereas pasturization aims at the reduction of bacterial organisms or at the establishment of conditions that prevent their development or activity, sterilization is directed at the complete destruction of all harmful micro-organisms. It is a known fact that few micro-organisms can long survive a temperature above 80° C. (176° F.) in the presence of moisture, with the exception of the spores of some bacteria, these spores requiring temperatures as high as 140° C. (284° F.) for their complete destruction. It is an object of this invention, therefore, to sterilize the sewage effluent from a complete treatment process so as to destroy harmful and undesirable bacterial organisms, virus organisms, protozoa, molds and spores, all part of a general class of micro-organisms.

One of the processes preferred for the conversion of brackish waters is electrodialysis. While this process is quite effective in reducing the content of dissolved solids in polluted water down to an acceptable level, it has no efficacy from the point of view of removing harmful or undesirable micro-organisms. Even some of the evaporation processes used in converting salt water are not quite effective from this point of view, as in certain processes evaporation takes place under vacuum and at temperatures as low as 140° F. or even lower. While it is assumed that the micro-organisms are incapable of being transported in the vapor liberated by the evaporation of the "mother" water, even at these low temperatures, there is no assurance that they will not be so transported and survive in the final fresh water supply. It is an object of the present invention, therefore, to provide a combined pasteurization and sterilization process which is superior to any present known means of providing fresh potable water by the conversion of either saline or brackish waters.

From the point of view of practical economics, it must be remembered that it takes in the neighborhood of 1000 B.t.u.'s to evaporate one pound of water. While multiple effect evaporation may reduce this value to as low as 200 or 300 B.t.u.'s, the increased cost of the equipment required for multiple effect evaporation detracts considerably from the savings effected by the reduction in the expenditure of heat for evaporation. On the other hand, raising water to even very high temperatures takes a considerably lesser amount of heat, as long as evaporation does not take place. For instance, raising one pound of water from 60° F. to 284° F. takes only 224 B.t.u.'s. If the heating process is so arranged that the water heated to its maximum temperature is used in turn to pre-heat the water entering the process, the ultimate expenditure of heat becomes related to the difference in temperature between the incoming water and the final outflow. It is an object of the present invention, therefore to provide a process and apparatus for rendering raw sewage effluents potable, which requires a much smaller amount of input energy than is true of other processes, such as evaporation-condensing, electrodialysis or the like.

It is a further object of the invention to provide a process and apparatus wherein all or part of the energy used in the pasteurization and sterilization comes from the sludge gases which are a by-product of the complete treatment sewage plant forming part of the system.

Still another object of the invention is to provide a process and apparatus which is flexible and adaptable to a large variety of situations and requirements, and which may be combined with various known processes for the purification of polluted liquids.

With the above and other objects in view, as will be presently apparent, the invention comprises a process and apparatus which will be presently described and properly claimed.

Reference may be had to the accompanying drawings, wherein:

FIGURE 16 is a further modification of FIGURE 3 including means for prevention of boiler scale.

In the drawings, like reference numerals indicate like parts in the several views.

Figure 1:
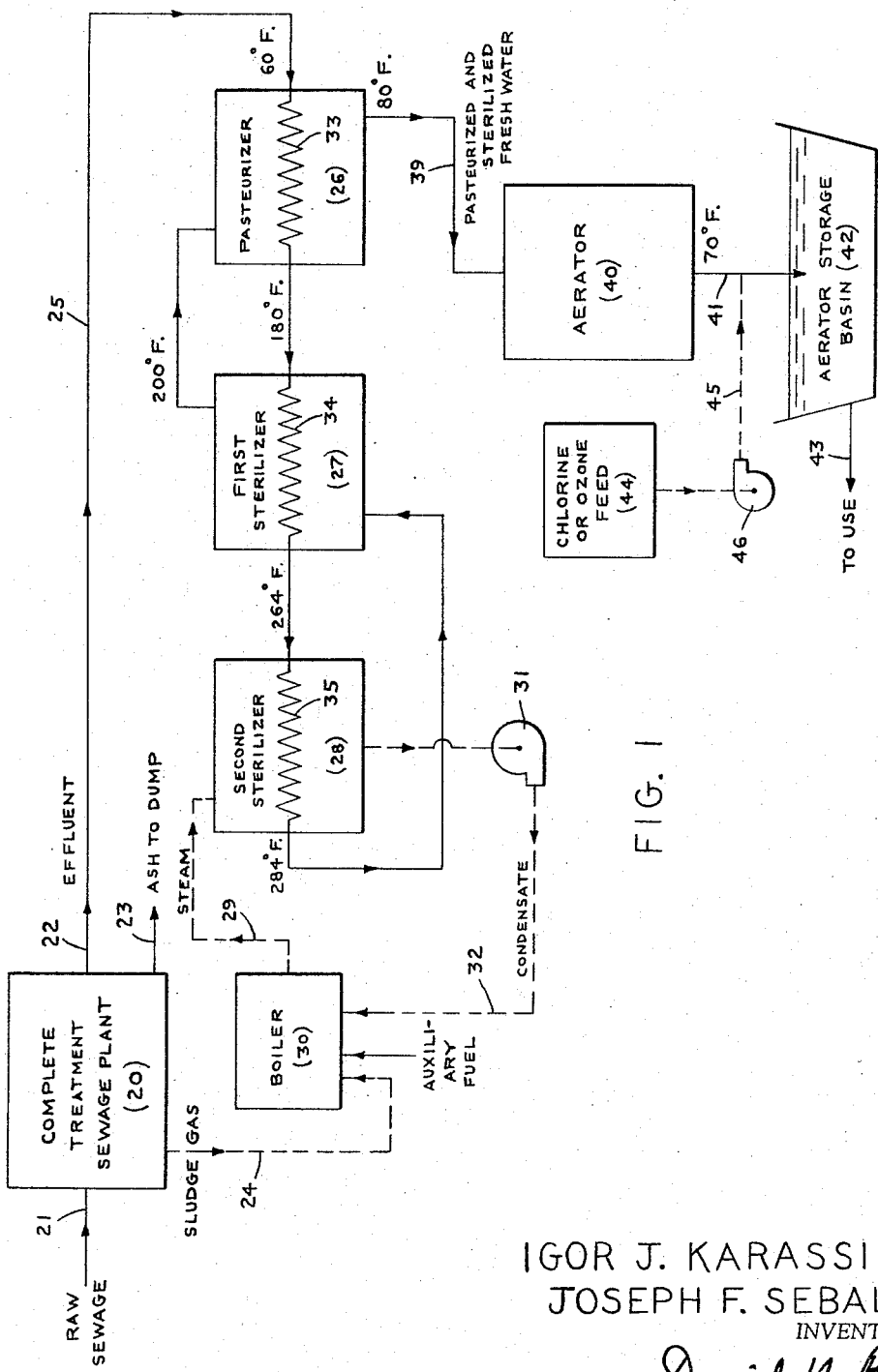
FIGURE 1 is a schematic flow diagram illustrating the process and apparatus of the invention in its most simplified form.
Figure 2:
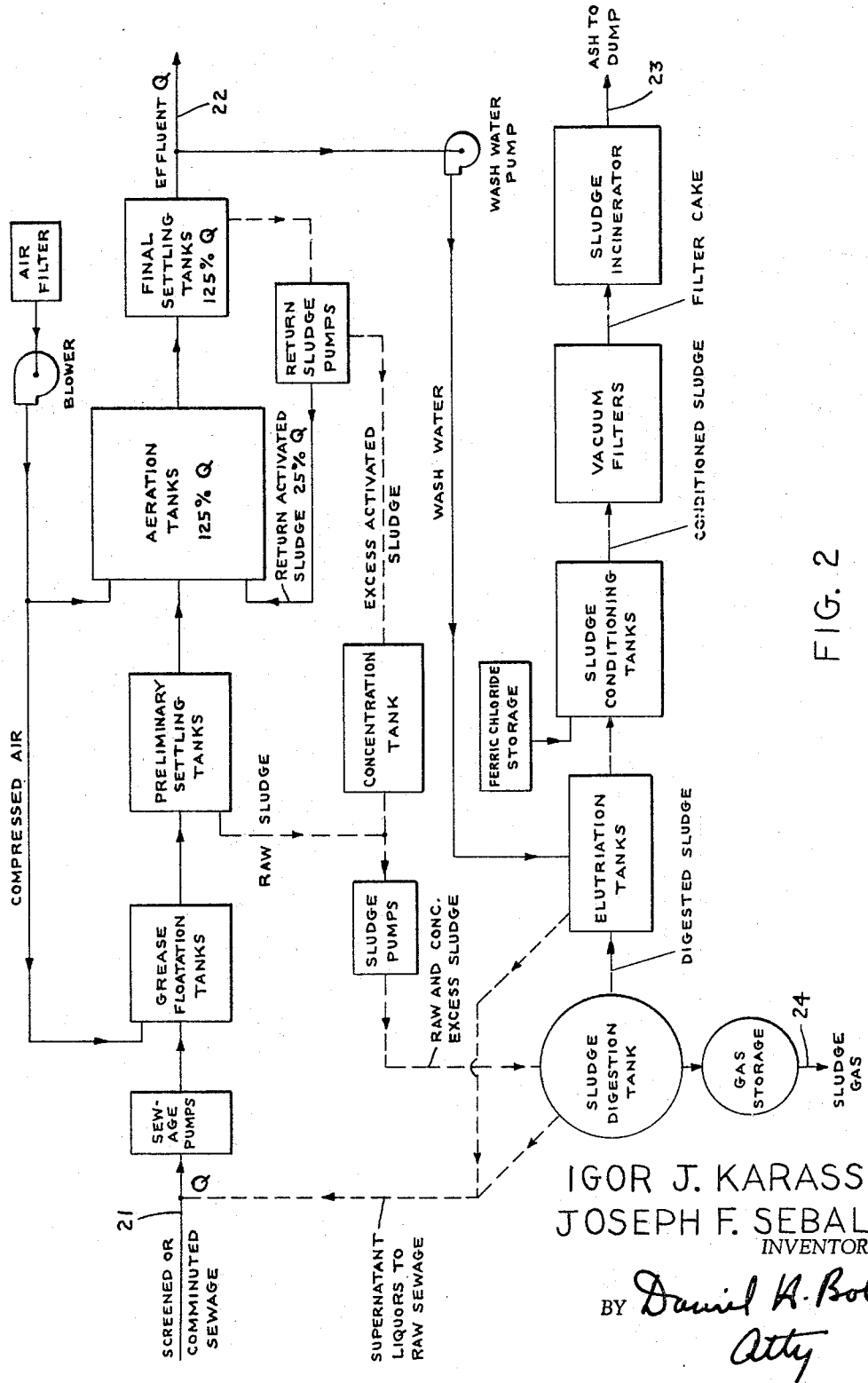
FIGURE 2 is a schematic flow diagram of a typical complete treatment sewage plant, such as would be used in the process and apparatus of the present invention.

Reference is made to FIGURE 1 which discloses a basic and simplified embodiment of the proces and apparatus of the present invention. The reference numeral 20 represents a complete treatment sewage plant. The details of this plant may vary considerably, and the specific nature of the plant is immaterial and does not represent a part of the present invention. Many different known forms of complete treatment plants could be used and still remain within the scope and purpose of the present invention. In order to present a full and operative disclosure of the invention, there has been presented in FIGURE 2 a typical system with complete treatment of sewage, such as is contemplated within the present invention. The full details and operation of the system of FIGURE 2 need not be described, these sytemns being well known in the art. It is necessary, however, that there be a complete treatment of the sewage; that there be an inlet 21 for the raw sewage which has been screened or comminuted, an outlet 22 for the effluent from the final settling tanks, a discharge 23 for solid matter, and, preferably, a discharge conduit 24 for sludge gas. The sludge gas is a known by-product of the sludge digestion tank, and is a combustible gas having a relatively high energy value. The clear and odor-free fluid leaving the discharge outlet of the complete treatment sewage plant is carried by a conduit 25 to a pasteurizer 26, a first sterilizer 27, and a second sterilizer 28. The second sterilizer 28 is a steam-to-water heat exchanger. Steam for the second sterilizer is provided through a conduit 29 by a boiler 30. Steam condensed in the second sterilizer by releasing of its heat to the effluent being sterilized is returned to the boiler by a condensate and boiler feed pump 31 in the return line 32.

The boiler 30 is preferably fired by sludge gas from the discharge conduit 24 of the complete treatment sewage plant, or by the sludge gas plus an auxiliary fuel, depending upon total energy requirements. It is not necessary that the boiler be fired by the sludge gas, and any form of heat energy available could be used. However, use of the sludge gas is an important concept as it utilizes what would ordinarily otherwise be a waste product, and it provides a cheap and readily available form of energy, which helps to make the process a practical one.

The first sterilizer 27 and the pasteurizer 26 are each counterflow water-to-water heat exchangers having heat exchange coils 33 and 34, respectively. The second sterilizer has heat exchange coil 35, as shown.

The discharge from the shell side of the pasteurizer is then carried by the conduit 39 to an aerator 40. A discharge 41 for the aerator leads to a storage tank 42, and general conduit means 43 lead to the service system. A chlorine and/or ozone feed tank 44 discharges through the conduit 45 into the fluid as it passes through the discharge conduit 41. Any sort of valving or pump means 46 may be used to control the amount of chlorine or ozone fed to the fluid as it moves from the aerator 40 into the storage tank 42.

The cycle illustrated shows certain preferred temperature values, and the heat exchange equipment and boiler would be designed to achieve these values. In its broader aspects, the invention is not limited to the precise temperatures, but in its more specific aspects, the temperatures named represent a preferred system of values.

With reference to the operation of the process, the clear and odor-free effluent flows through the conduit 25 into the heat exchange coil 33 of the pasteurizer 26. In this coil, the temperature is raised by a process of heat exchange with the shell side of the pasteurizer from 60° F. to 180° F., the latter representing a pasteurizing temperature. From the coil 33, the effluent then proceeds to the first sterilizer 27, and in the coil 34, by a process of heat exchange with the shell side of the first sterilizer, the temperature is raised from 180° F. to 264° F., the latter being a sterilizing temperature. From the coil 34, the effluent then proceeds to the second sterilizer, and by direct exchange with the boiler steam, the temperature is raised from 264° F. to 284° F. The effluent from the coil 35 then returns to the shell side of the first sterilizer where it gives up a sizeable portion of its heat, the temperature being reduced from 284° F. to 200° F. From the shell side of the first sterilizer, the effluent then proceeds to the shell side of the pasteurizer. Again, it gives up a substantial portion of its heat to the incoming effluent in the coil 33. In the pasteurizer, the temperature of the effluent in the shell drops from 200° F. to approximately 80° F.

It will be noted that the effluent emerges from the pasteurizer at a temperature somewhat in excess of the entering temperature. In the example illustrated in FIGURE 1, it is assumed that the heat exchangers have been so selected that the exit temperature is only 20° F. higher than the entrance temperature. Thus, approximately 20 B.t.u.'s of heat will have been added to the effluent in the second sterilizer for each pound of effluent. This is considerably less than the 200 to 1000 B.t.u.'s per pound required in an evaporation process.

In order to cool the effluent to more suitable temperatures as well as to aerate it substantially to further improve its taste, the water proceeds from the pasteurizer to an aerator. This may be provided in any one of the many forms readily available on the market, as, for example, a spray pond or tower. As the water leaves the aerator, it is supplied with any desired amount of chlorine or ozone which may assist in the control of micro-organisms in the storage system.

The invention contemplates that the operation of the pasteurizing and sterilizing units can be, if desired, made completely automatic by means of controls readily available on the market. Safety devices that would protect the final water supply from contamination in the event of failure of any portion of the plant may also be incorporated. The schematic illustration of FIGURE 1 does not necessarily show all of the pumping equipment that would be needed to convey the fluids through the process, but it is to be understood that such pumps could be incorporated where needed.

Figure 3:
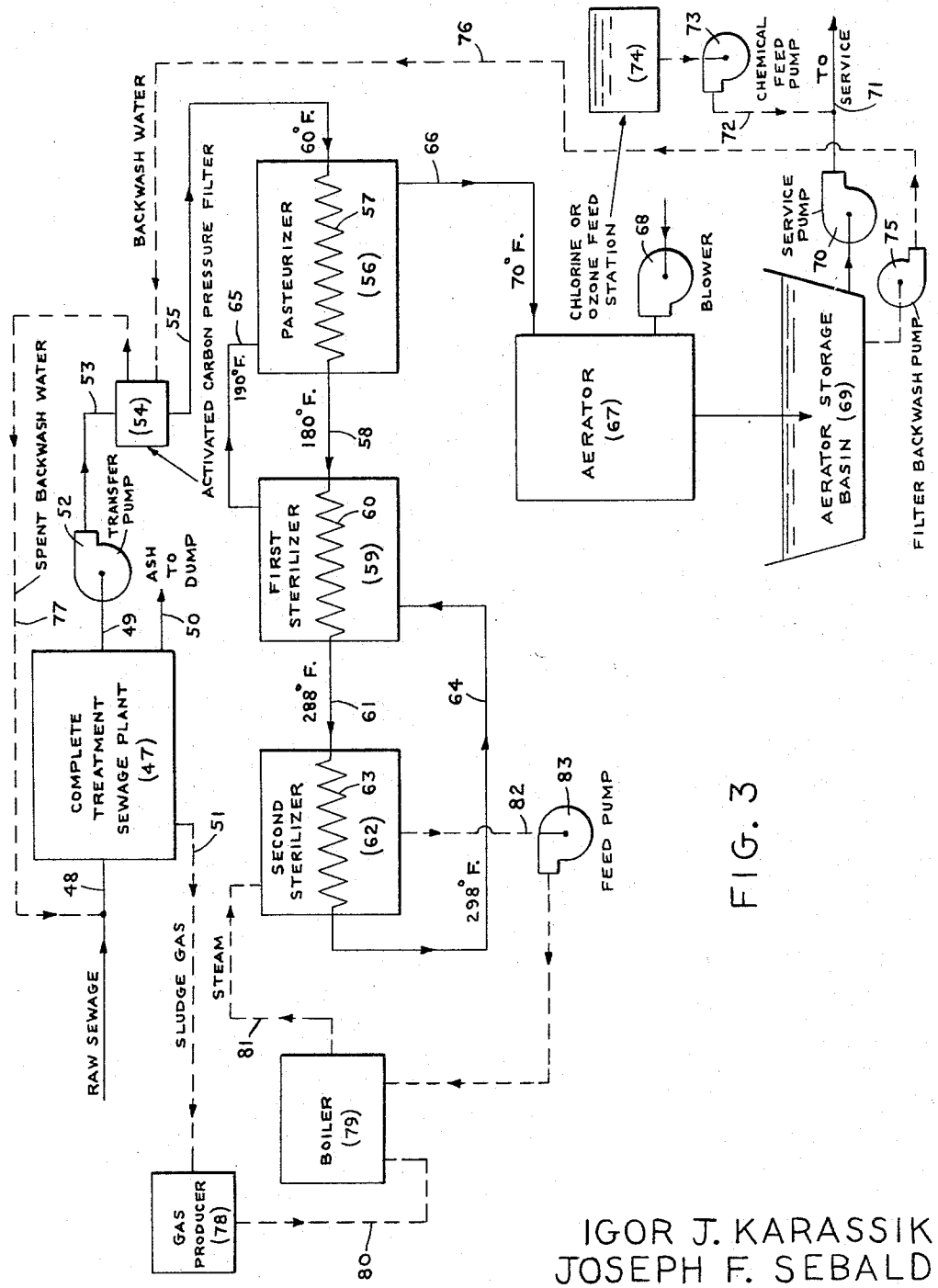
FIGURE 3 is a schematic flow diagram of a modification of the basic process and apparatus of the present invention, presenting a more complex working system.

In FIGURE 3 is shown a modification of the basic system, and in this modification the system is slightly more complete as to certain details of operation. As in the basic system of FIGURE 1, the system of this modification has a complete treatment sewage plant 47 which is provided with a raw sewage inlet 48, an effluent outlet 49, a discharge 50 to the ash dump, and a discharge 51 for sludge gas. The transfer pump 52 moves the effluent under pressure through the conduit 53 to a pressure filter 54. This filter 54 is preferably an activated carbon filter, but any suitable filter arrangement which is the equivalent of the activated carbon pressure filter could be used. The filtered liquid moves through the conduit 55 to the pasteurizer 56, the said effluent passing through the heat exchange coil 57 to a connecting conduit 58. From the connecting conduit 58, the effluent then passes to the first sterilizer 59, passing through the heat exchange coil 60 to the connecting conduit 61. From the conduit 61, the effluent passes through a second sterilizer 62 having a heat exchange coil 63. From the heat exchange coil 63, the sterilized fluid then passes through the conduit 64 back to the first sterilizer 59 in heat exchange relationship with the coils 60. From the first sterilizer 59, the effluent then passes through the conduit 65 back to the pasteurizer 56 in heat exchange relationship with the coil 57. From the pasteurizer, the sterile effluent then moves through the conduit 66 to an aerator 67. The fluid drops through the aerator and is exposed to a blast of air from the blower 68 wherein it is thoroughly aerated and oxygenated. The fluid is then discharged to a storage basin 69 for general storage purposes. A service pump 70 delivers fluid from the storage basin through a conduit 71 to the service or use system. Feeding into the conduit 71 is a conduit 72 which carries chlorine or ozone under pressure from the chemical feed pump 73, the additive being supplied from the feed station 74.

It is desirable to provide backwash water for the pressure filter 54 for reactivating the filter. Therefore, a filter backwash pump 75 delivers backwash water through the conduit 76 to the filter 54. The details of the backwash structure of the filter 54 are well known in the art and do not form a part of this invention. Details of the valving to accomplish this have, therefore, not been shown, but it is important to the system and a part of the present invention that the spent backwash water from the filter 54 be carried by a conduit 77 back to the raw sewage inlet 48. This provides maximum fluid conservation in that the spent backwash water joins the system where it again passes through the filtration, pasteurization and sterilization of the system.

For providing heat energy for the system, the sludge gas from the discharge 51 of the complete treatment sewage plant passes to a gas producer unit 78. If the sludge gas is insufficient to meet the fuel requirements of the boiler 79, then gas is added in the producer to make up the total energy requirement as needed or desired. A conduit 80 conducts the fuel gas to the boiler 79. The steam discharge of the boiler 79 is carried through a conduit 81 to the second sterilizer 62 in heat exchange relationship with the coil 63. Discharge from the sterilizer 62 is through the conduit 82 to a feed pump 83, whence it moves under pressure back to the boiler 79.

In the operation of this system, the filter 54 removes the last traces of suspended solids from the sewage treatment plant effluent. In the pasteurizer 56, the effluent preferably enters at an ambient temperature, for example, of 60° F. and leaves at a temperature of 180° F. Either by means of the basic design and size of the pasteurizer, or by suitable valving and control means not shown, the effluent can be raised to a predetermined temperature and held for a predetermined time. The effluent then moves on to the heat exchange coil 60 of the first sterilizer where it reaches a predetermined temperature and is held for a required time, the liquid being discharged preferably at a temperature of 288° F. From this point, the effluent moves to the second sterilizer 62 where it is given a maximum predetermined temperature and held for a predetermined time, being discharged preferably at a temperature of 298° F. This hot fluid then moves back to the first sterilizer 59 in heat exchange relationship, giving up its heat to the effluent in the coils 60, dropping preferably to a temperature of 190° F. This still hot sterilized effluent then returns to the pasteurizer 56 in heat exchange relationship with the coil 57, losing its high heat to the effluent in the coil 57 and discharging at approximately 70° F. With this counterflow system, a minimum energy is required for carrying out the pasteurization and sterilization process, and the size of the total heat transfer apparatus is inversely proportional to the temperature difference between the process water entering and leaving the pasteurizer and the purification system. The cooled, pasteurized and sterilized effluent then moves to the aerator 67, where it is brought to oxygen saturation for the purpose of reducing any odor or taste which may have developed in the process. The addition of ozone or chlorine further sterilizes the water, and a small portion of the discharge is used for reactivating the pressure filters in an economical fluid saving manner as above described.

Figure 4:
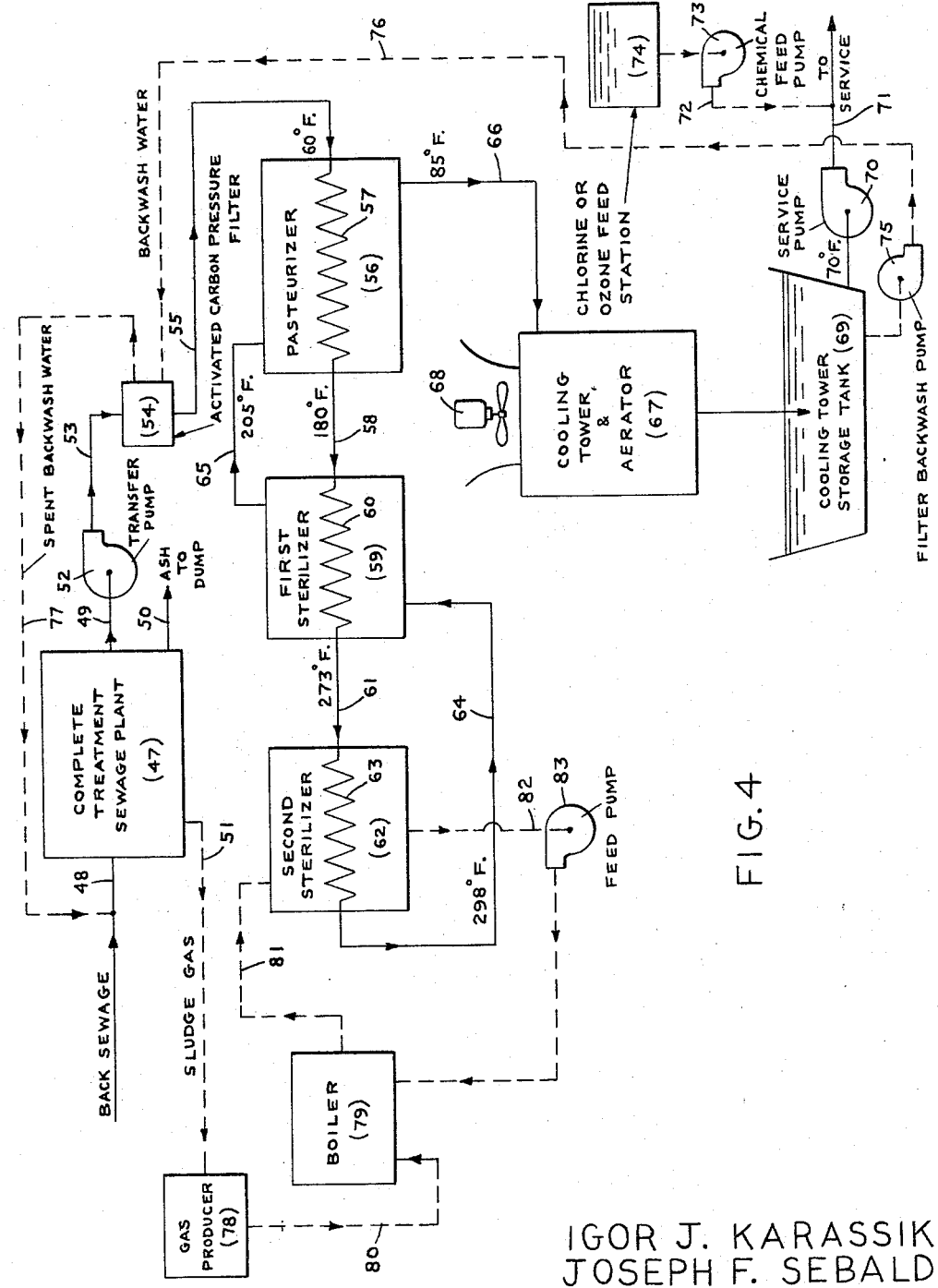
FIGURE 4 is a schematic flow diagram of another modification of the process of the invention, which is slightly different from that of FIGURE 3.

The modification of FIGURE 4 is structurally very close to the system of FIGURE 3, disclosed in detail above, and a description need not be repeated. The main difference in this modification is that the heat exchangers for the pasteurizer 56 and sterilizers 59 and 62, respectively, are smaller per unit, resulting in a higher temperature difference between the entering effluent through the conduit 55 and the discharge effluent through the conduit 66. For example, the filtered effluent enters at 60° F., leaving the pasteurizer at 180° F. In the first sterilizer 59, the temperature is raised to 273° F. In the second sterilizer 62, the temperature is further raised to 290° F. In the counterflow through the first sterilizer, the fluid is dropped only to 205° F., and in the counterflow in the pasteurizer, the temperature drops to only 85° F. Therefore, the aerator 67 is designed to serve as both aerator and cooling tower, dropping the 85° F. fluid to storage temperature.

Figure 5:
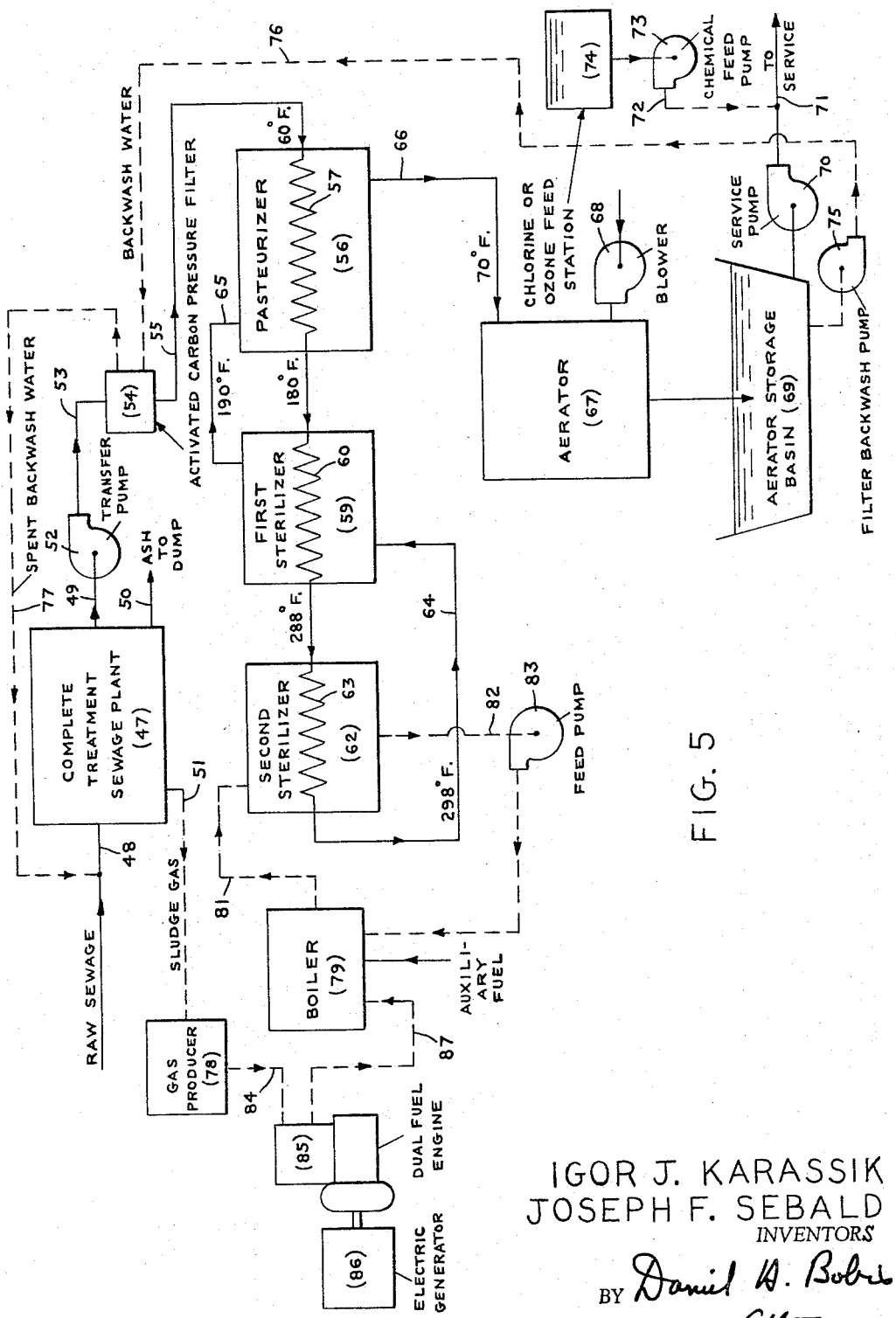
FIGURE 5 is a schematic flow diagram of a modification of the process and apparatus of the present invention, similar to FIGURE 3 but presenting a different energy supply arrangement.

The modification of FIGURE 5 approaches very closely the process and apparatus set forth in FIGURE 3, the only essential difference being in the energy supply. For that reason, a detailed description will not be given of the complete system, but attention is directed to the disclosed variation in the energy input. Gas from the gas producer 78, which comprises sludge gas alone, or a mixture of sludge gas and gas from any producing source, is led by a conduit 84 to a dual fuel engine 85. This engine is designed to operate on either sludge gas, or any produced gas, or mixture thereof. The engine drives a generator 86 which gives electrical power for any desired use. A particular use contemplated in this invention is to energize the drive motors for all of the pumps and blowers of the disclosed purification system, thereby eliminating or materially reducing the outside energy which would otherwise be required for the system. This increases the overall efficiency of the system. Waste heat from the engine 85 is carried by the conduit 87 to the boiler 79, providing a heat energy source for the sterilization system. In this arrangement, maximum use is made of the energy provided by the sludge gas and a very high efficiency of energy use is obtained.

Figure 6:
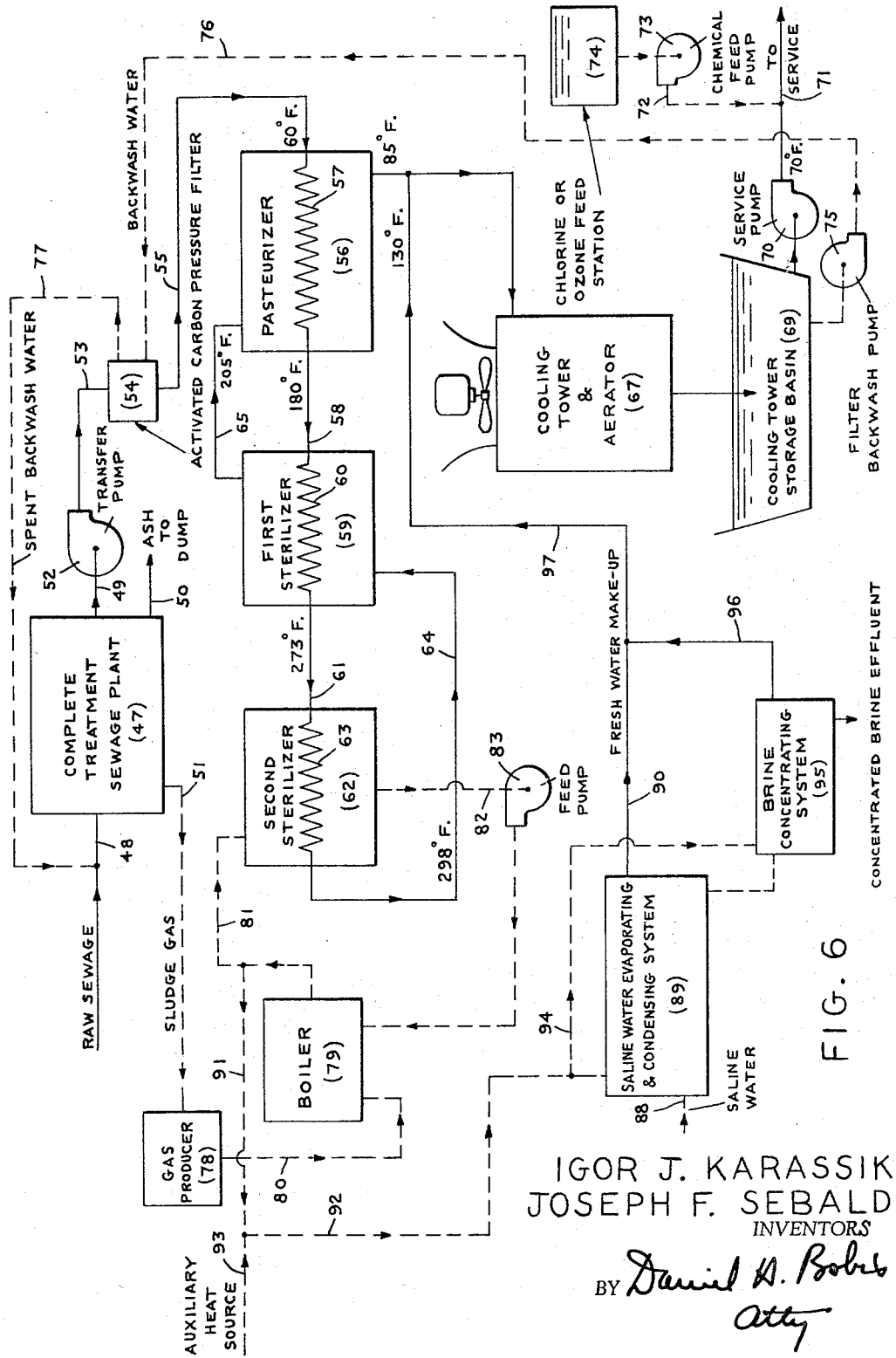
FIGURE 6 is still another modification of the process and apparatus, similar to FIGURE 3, but providing for a fresh water make-up.

In the modification of FIGURE 6, the pasteurizer and sterilizer system is very close to that shown in FIGURE 4, and it is not necessary to repeat the detailed description of the system, the reference numerals of the system components being the same as those applied in FIGURES 3 and 4.

In this modification, it is assumed that the treated effluent is insufficient to meet the service needs of the use system, and that a supply of saline water is available, such as would be present, for example, in any coastal or port city. A saline water inlet 88, therefore, supplies fluid to a known saline water evaporating condensing system 89. This system, which is a well known one, applies heat to saline water, bringing it to boiling temperature at any given pressure to cause evaporation. The vapor is then condensed and discharged as a clear, substantially sterilized fluid to a discharge conduit 90. In order to provide the heat energy for evaporating saline water, steam generated by the sludge gas in the boiler 79 is taken off through a branch conduit 91 and carried by the conduit 92 to the evaporator in the system 89. If the heat energy of the steam, as supplied by the conduit 91 is insufficient, an auxiliary heat source 93 may provide the additional heat energy. In order to further improve the total efficiency of the system, steam from a conduit 92 is carried by the conduit 94 to a brine concentrating system 95. The brine concentrating system receives concentrated unevaporated fluid from the saline water evaporating condensing system 89 and further concentrates the brine to a degree where it becomes a concentrated brine effluent, representing a salable by-product, helping to reduce the total cost of the purification system. The brine concentrating system 95 discharges a clear condensate through the conduit 96. The fresh water from the conduits 90 and 96 joins in flowing through a conduit 97 that feeds into the conduit 66 leading to the cooling tower and aerator. The temperature of the fresh water make-up will normally be quite high, as, for example, 130° F., and the cooling tower 67 is therefore necessary to bring the water down to normal storage temperature.

The modification of FIGURE 7 again is adapted to a situation wherein the treated effluent is insufficient for service needs and wherein it is necessary to add fresh make-up water. The basic pasteurizing and sterilizing part of the system is the same as shown and described in FIGURE 3, and this part of the system need not, therefore, be again described. The reference numerals applied are similar to those in FIGURE 3 for similar parts of the system, and the operation is substantially the same.

In this modification, the discharge 82 from the second sterilizer does not go directly to a boiler feed pump, but the steam and condensate proceed to a drain trap 98, and the fluid is carried by the conduit 99 to a condenser 100. The steam supply conduit 81 which connects the boiler 79 and the second sterilizer 62 has a branch conduit 101 which delivers steam to a turbine 102. The turbine 102 drives an electric generator 103. The discharge from the turbine 102 is delivered to the condenser 100. The condensate in the form of liquid from the condenser is pumped by the condensate return pump 104 back to the boiler 79.

Power developed by the generator 103 is delivered by the power lines 105 and 106 to an electrodialysis unit 107. This conversion unit is in itself well known, and the detailed operation of the unit is not in itself a part of this invention. This conversion unit has a brackish water inlet 108, a discharge 109 for brine effluent, and a discharge 110 for fresh water which joins the connecting conduit 66 at the junction 111. Thus, fresh make-up water is added to the sterilized effluent in the conduit 66, and the two, combined, make up the service needs of the use system. This system presents a maximum efficiency and conservation of energy, the primary energy for the purification system coming from the waste gas by-product of the complete treatment sewage plant.

Figure 8:
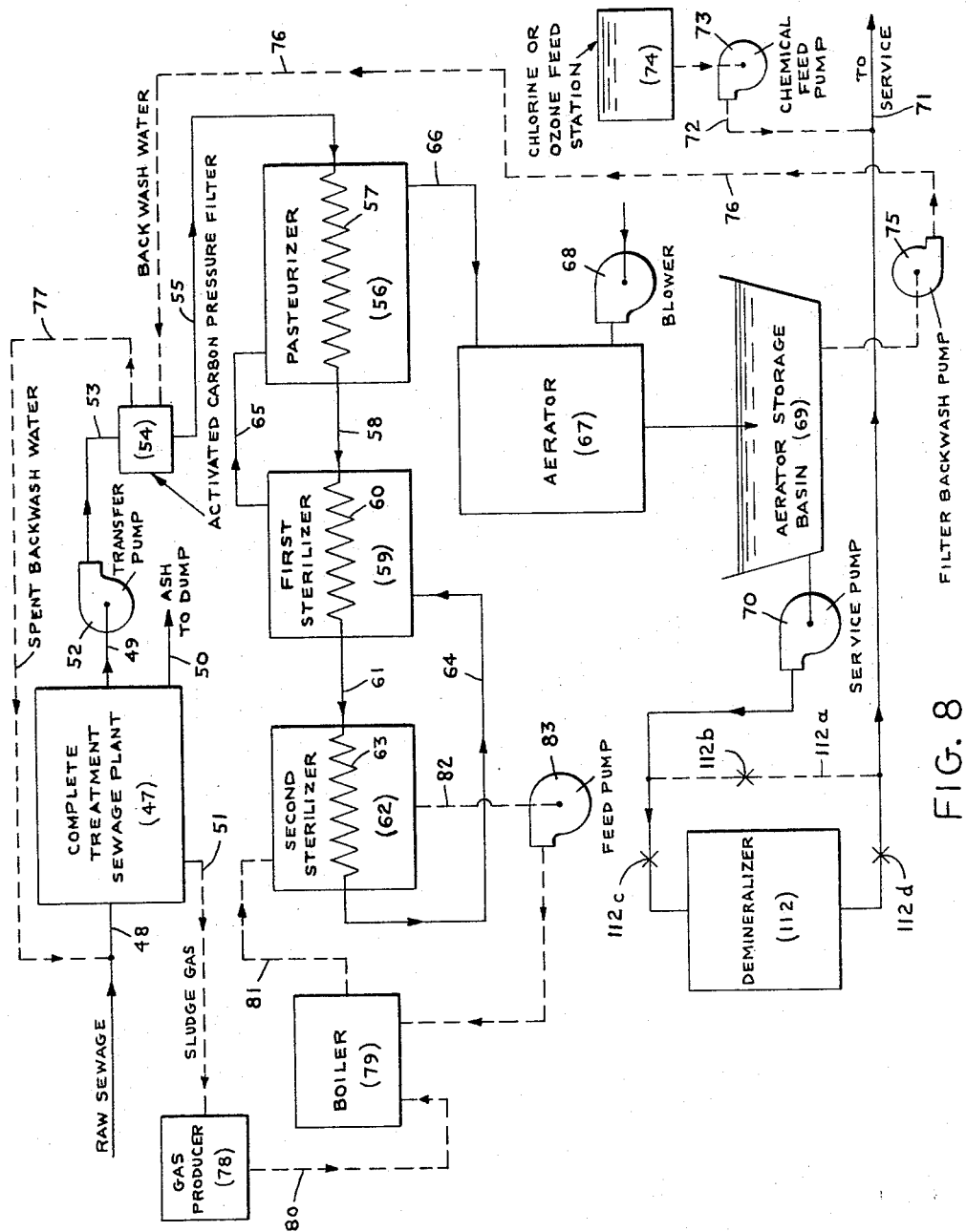
FIGURE 8 is a schematic flow diagram of a modification, similar to that of FIGURE 3, but adding a demineralizing step.

In FIGURE 8, the modification differs only from FIGURE 3 in that the service pump 70 discharges fluid from the storage basin to a demineralizer unit 112. The purpose of this unit is to remove dissolved solids, mainly those which are objectionable and which cannot be removed in the sewage treatment plant. The demineralizer is shown with a bypass 112a and valves 112b, 112c and 112d which may be used fully or partially to control the degree of final treatment as well as to provide means for bypassing the demineralizer during servicing.

Figure 9:
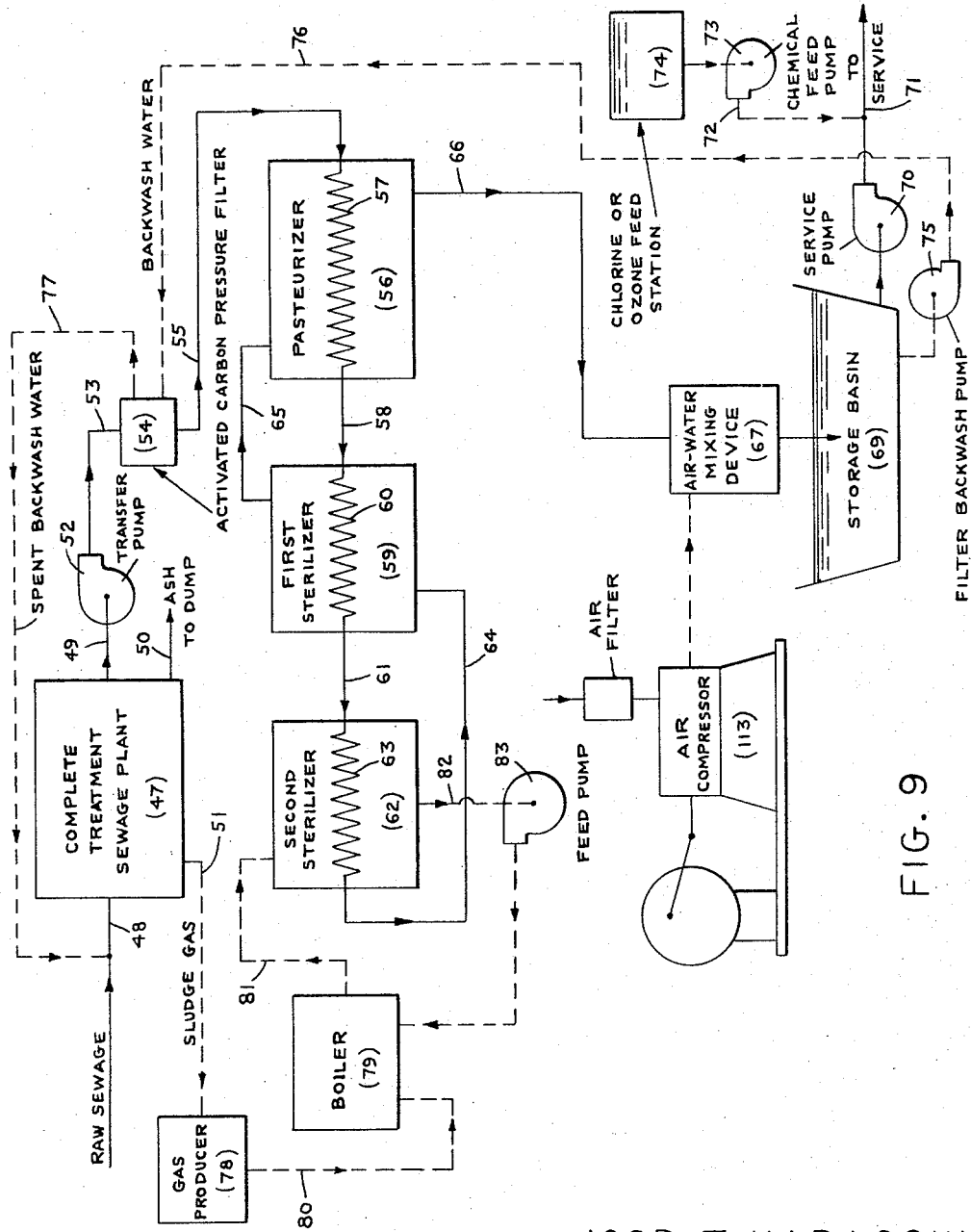
FIGURE 9 is still another modification of the process and apparatus of the invention, similar to FIGURE 3, but with a variation in the aeration device.

The modification of FIGURE 9 is the same as the system disclosed in FIGURE 3 and described in detail, with the exception that the unit 67 is an air-water mixing device which uses an air compressor 113 to pump filtered air at high pressure into the effluent from the conduit 66. This arrangement lends itself to air washing and air purifying before adding the air to the process water, and saves space in the overall installation.

Figure 10:
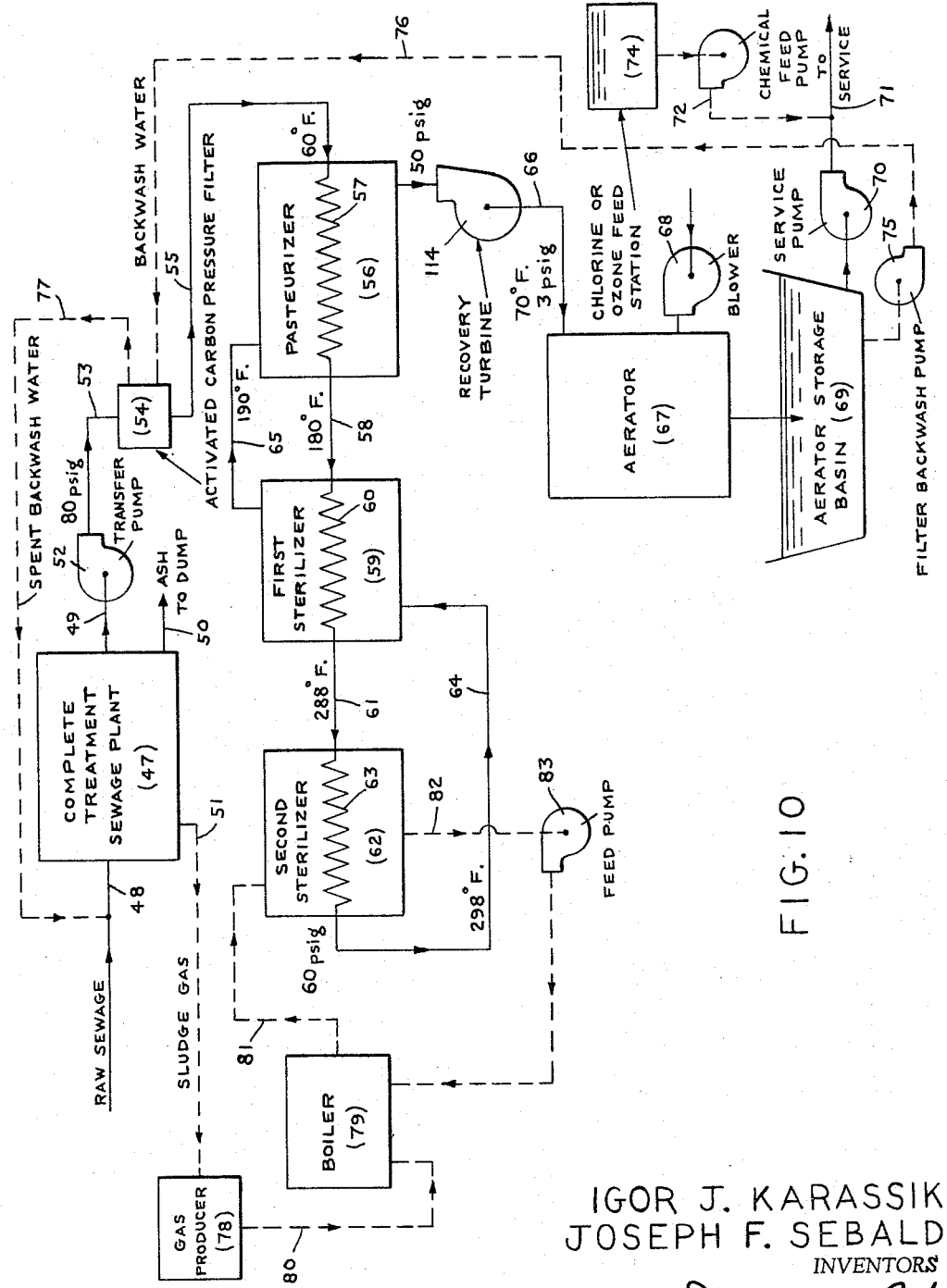
FIGURE 10 is a schematic flow diagram of still another modification, similar to FIGURE 3, but adding a recovery turbine.

The modification of FIGURE 10 involves a process and apparatus that is very close to that of FIGURE 3 insofar as most of the process steps are concerned and insofar as the apparatus is concerned. However, in this modification, a power recovery turbine 114 is placed in the connecting conduit 66 between the pasteurizer 56 and the aerator 67. The use of the recovery turbine 114 is based upon the fact that the transfer pump 52 must be capable of developing a discharge pressure sufficient to maintain a pressure at the outlet of the second sterilizer safely in excess of the vapor pressure at the prevailing maximum temperature. Thus, a substantial pressure head must be throttled away in the form of waste energy.

In the way of a specific example, it is noted that the vapor pressure at the indicated temperature of 298° F., as shown in FIGURE 10, is 50.35 p.s.i.g. To be on the safe side, therefore, it is advisable to maintain at that point of highest temperature in the system an imposed pressure in excess of 60 p.s.i.g. It is necessary to compensate for estimated friction losses in the piping, the filter and the heat exchangers, and, therefore, the discharge pressure of the transfer pump 52 may be 80 p.s.i.g. or more. In calculating the pressure in the conduit 66, just ahead of the aerator, it is necessary to deduct the losses in the return path of the effluent through the sterilizer 59 and the pasteurizer 56, and the pressure, therefore, is estimated to be in the order of 50 p.s.i.g. If spray valves are used in the aerator, there would be an estimated pressure requirement of approximately an additional 3 p.s.i., and the result is a net loss of about 47 p.s.i. to be throttled away. By using the recovery turbine 114, therefore, a substantial portion of this energy loss can be recovered.

To illustrate the possible saving, it is assumed that the purification system handles 10,000,000 gallons of fluid a day, representing a flow of 6,950 g.p.m. The transfer pump 52 would be designed to develop 80 p.s.i. net (185 feet) and may have an efficiency of 87%. The calculated horepower would be as follows:

$$B\ HP = \frac{6950 \times 185}{3690 \times 087} = 372\ HP$$

The head available to the power recovery turbine is 47 p.s.i. (109 feet). If the turbine has an efficiency of 82%, 156 horsepower will be available for use. This power can be used to help drive the service pump or the transfer pump, thereby minimizing the power consumption of the equipment and reducing the size of power units used in the system.

Figure 11:
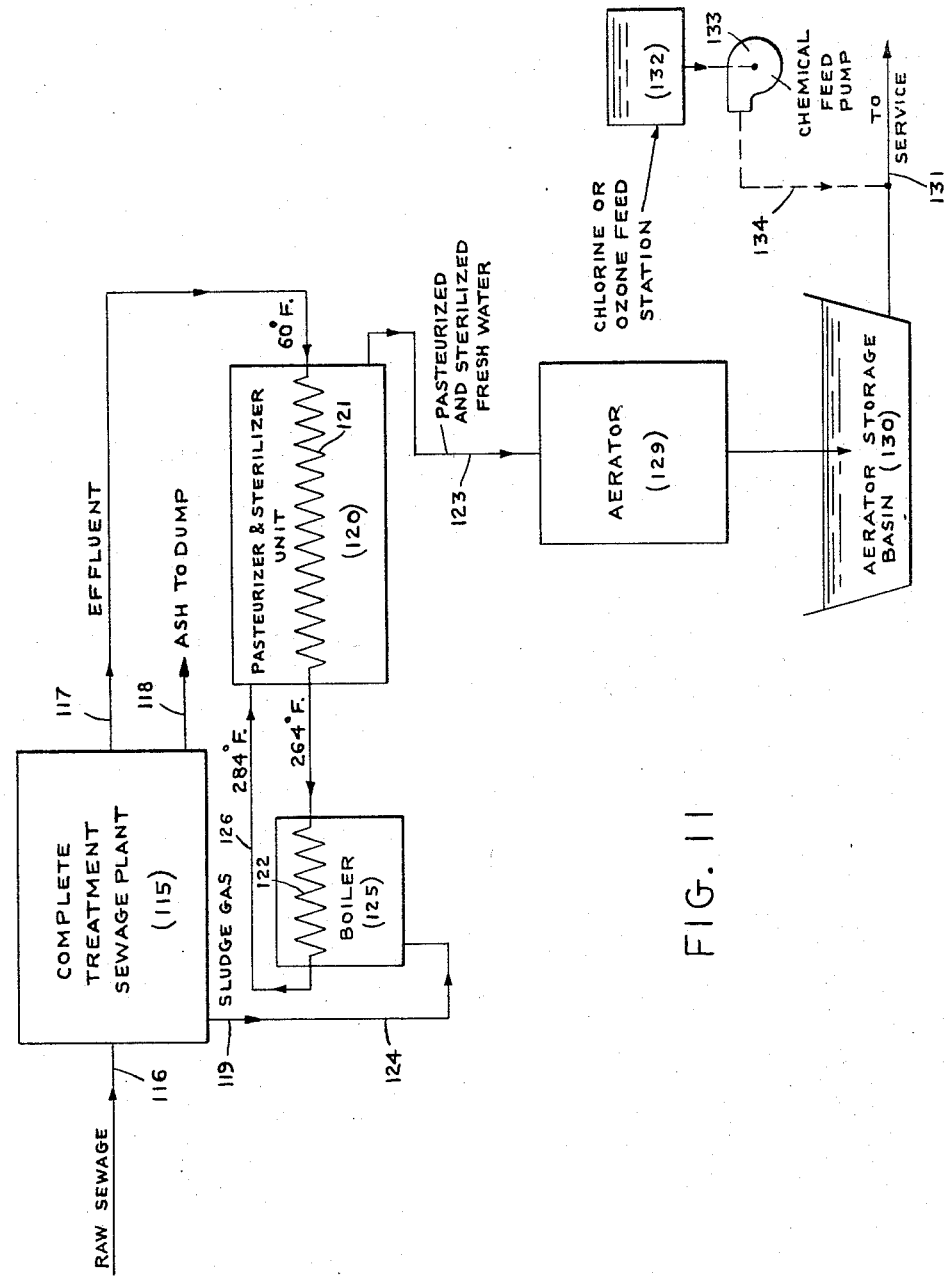
FIGURE 11 is a schematic flow diagram of still another modification of the process and apparatus of the invention, showing a combined pasteurizer and sterilizer.

In carrying out the process of the invention, it is not necessary that pasteurization and sterilization be accomplished in separate heat exchange units. In the modification of FIGURE 11 is shown a simplified system generally similar to that of FIGURE 1, involving a single pasteurizer and sterilizer unit. As in the prior disclosed systems, there is a complete treatment sewage plant 115 having an inlet 116 for raw sewage, an outlet 117 for clear effluent, a discharge 118 for ash solids, and a discharge 119 for sludge gas. The effluent moves to a heat exchange unit 120, passing through a heat exchange coil 121 which extends to one end of the heat sxchange unit, and then discharges to the connecting conduit 123.

The sludge gas from the outlet 119 is carried by the conduit 124 to the boiler 125 where it provides fuel for boiler operation. The steam circuit of the boiler comprises a coil 122, which delivers steam through the conduit 126 to the shell of the heat exchanger, a condensate return pump 127 which receives the condensate from the shell, and a connecting conduit 128 which delivers condensate to the steam coil 122.

Effluent from the connecting conduit 123 is delivered to the aerator 129 from whence it passes to the aerator storage basin 130. As in the prior systems disclosed, the discharge 131 leads to service, and chlorine or ozone may be fed to the service system from the feed station 132 by means of the chemical feed pump 133 by means of the conduit 134.

In this modification, the effluent is raised through pasteurizing temperatures to sterilizing temperatures in the single heat exchanger, by indirect exchange with the boiler steam.

Figure 12:
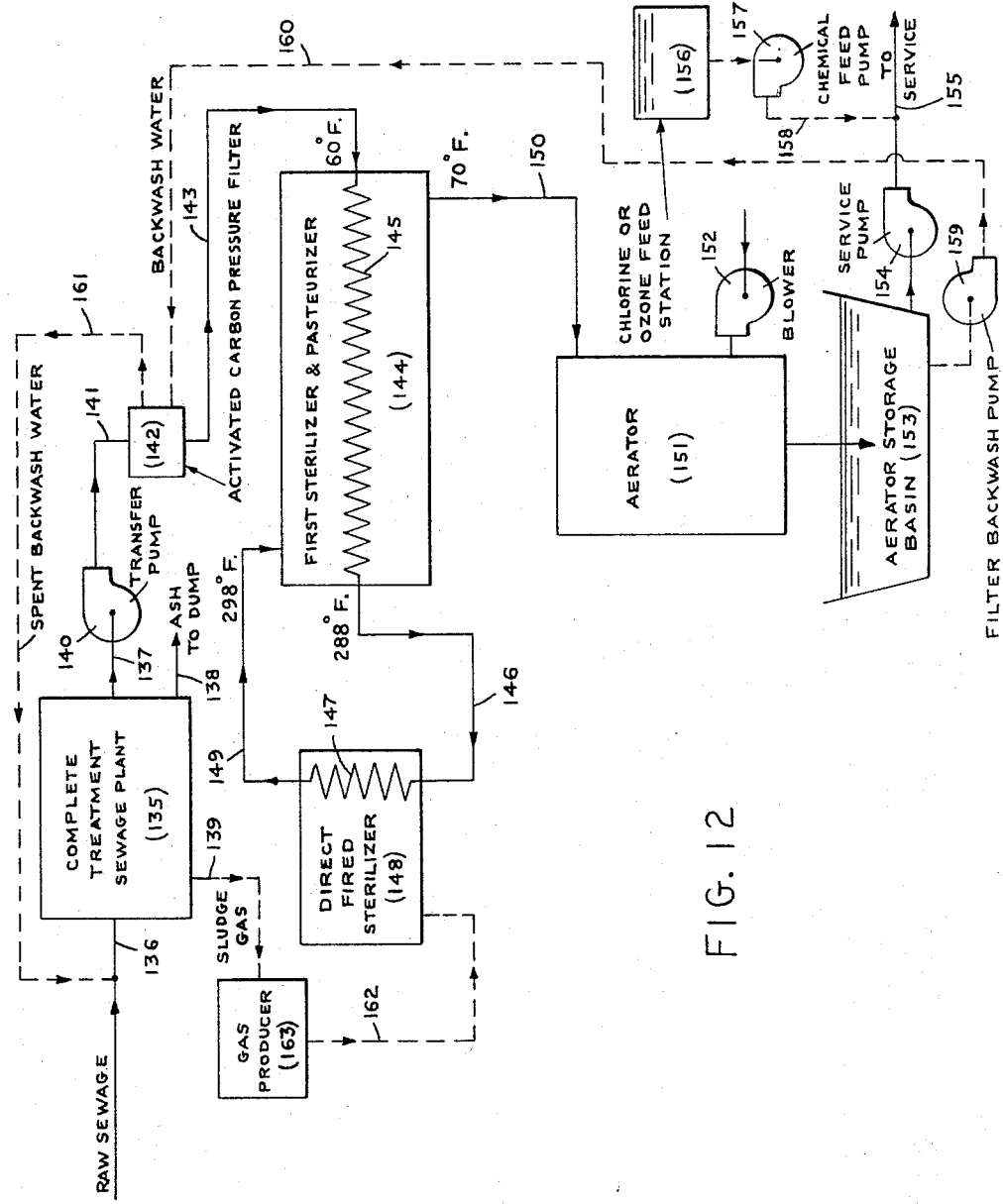
FIGURE 12 is a schematic flow diagram of a modification providing a more complex and complete version of the system of FIGURE 11.

The modification disclosed in FIGURE 12 presents a somewhat more complex and complete version of the process and apparatus shown in FIGURE 11. The basic process and apparatus is the same as other modifications disclosed herein, but the details of the process vary somewhat. A complete treatment sewage plane 135 is provided with an inlet 136 for raw sewage, the outlet 137 for clear effluent from the complete treatment plant, a discharge 138 to the ash dump, and a discharge outlet 139 for the by-product sludge gas.

A transfer pump 140 pumps the effluent through the connecting conduit 141 to a pressure filter 142. The effluent with stray solids removed then moves to the connecting conduit 143 to the heat exchanger 144, which is a combined sterilizer and pasteurizer. The effluent moves through the heat exchange coil 145, discharging through a connecting conduit 146 to the heat exchange coil 147 of a direct-fired hot water heater 148. The fluid being raised to the desired temperature then moves through the connecting conduit 149 back to the heat exchanger 144, where the fluid moves in counterflow arrangement to the heat exchange coil 145, discharging through the conduit 150.

As in the other modifications, the conduit 150 discharges into an aerator 151, the air blast for the aerator being furnished by the blower 152. Discharge from the aerator is to a storage basin 153. From the basin, the fluid is pumped by the service pump 154 to the service line 155. A chlorine or ozone feed station 156 pumps fluid by means of the chemical feed pump 157 through the conduit 158 which joins the service line.

A filter backwash pump 159 takes water from the storage basin 153 and moves it through a line 160 to the pressure filter 142. The backwash water and the waste solids which it picks up in the filter 142 are then received by a conduit 161 which returns the mixture to the raw sewage inlet 136. As before, the sludge gas moves to a producer or storage unit 163 and from thence by means of the conduit 162 to the burner of the furnace 148. The sludge gas provides all of the combustible fuel for the direct-fired hot water furnace, but, if necessary, additional gas from the the gas producer can be added to complete the energy requirement.

With reference to the operation of this modification, it will be noted that effluent entering the pasteurizer and sterilizer at 60° F. is raised to a temperature of 288° F. by its passage through the heat exchange coil 145. In the coil 147 of the furnace, the effluent is then raised to its desired temperature of at least 298° F. This hot liquid, then moving back through the sterilizer and pasteurizer 144 in counterflow arrangement to the heat exchange coil 145 raises the temperature of the incoming effluent, providing for maximum conservation of heat energy. In heating the incoming effluent, the temperature of the counter flow effluent drops from 298° F. to 70° F.

Figure 13:
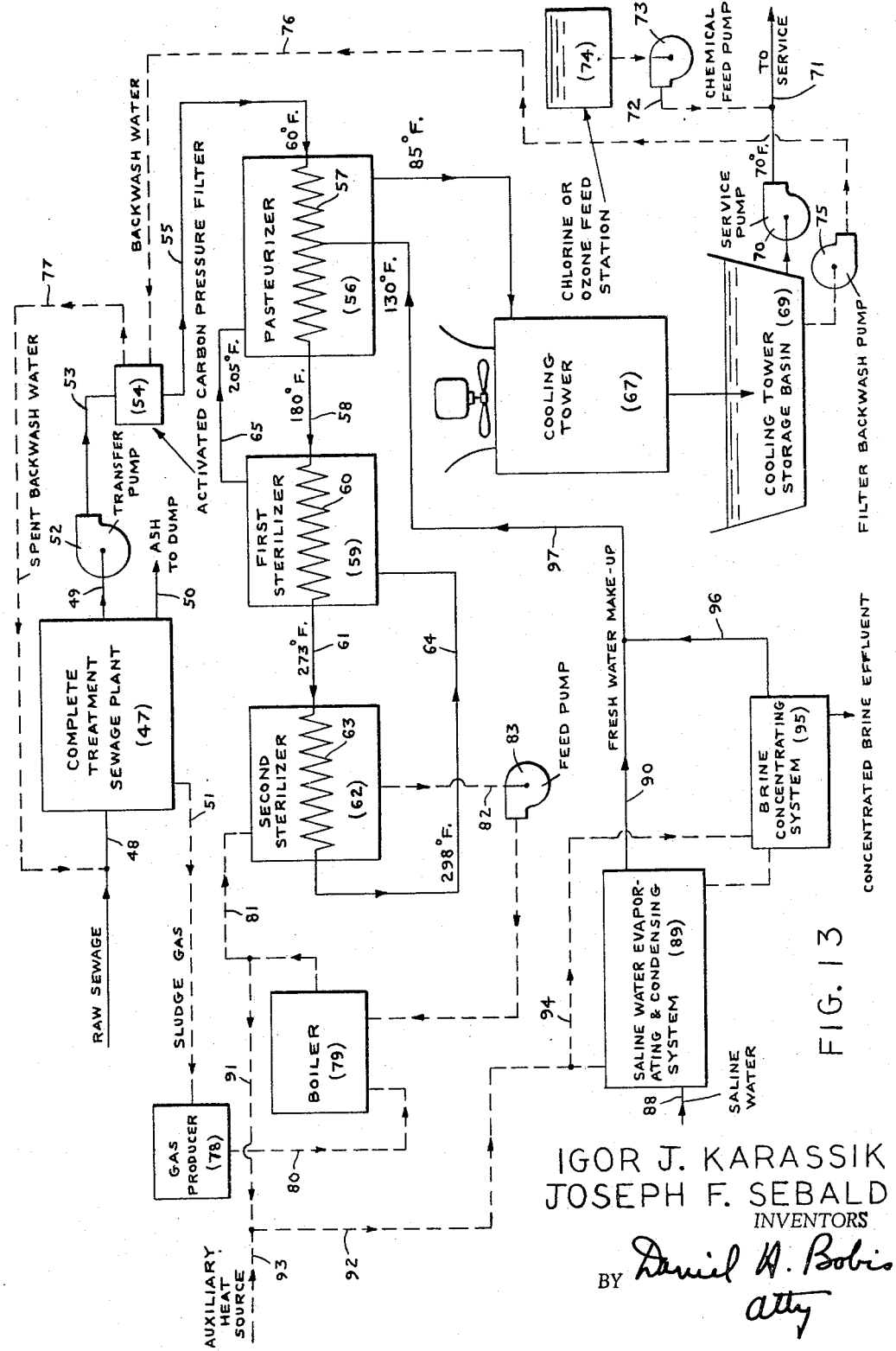
FIGURE 13 is a modification, similar to FIGURE 6, but providing a different handling of the make-up water.

Consideration is now given to the modification of FIGURE 13. The method and apparatus disclosed in FIGURE 13 is very close in most respects to the method and apparatus disclosed in FIGURE 6, and for a complete description of the system of FIGURE 13, reference is made to the description in the present specification as applied to FIGURE 6. The only difference, but a highly significant one, is that the conduit 97, which carries make-up water from the saline water evaporating-condensing system and brine concentrating system, is directed to the heat exchange coil 57 in the pasteurizer 56. Preferably, the conduit 97 enters the heat exchange coil 57 at a midpoint of the coil, as shown in FIGURE 13.

The importance of this modification arises from the fact that the evaporative system for the saline water very likely will be one that operates at relatively low temperatures, as, for example, below 212° F. Accordingly, the fresh make-up water in the conduit 97 may not be free of harmful micro-organisms, particularly those such as the bacterial spores which are resistant to fairly high temperatures. In this system, therefore, passing of the fresh make-up water through the pasteurizing and sterilizing apparatus will assure that the service 71 receives fully potable and safe water.

In the example of FIGURE 13, it will be noted that the fresh make-up water is delivered at approximately 130° F. In the pasteurizer, the temperature of the effluent is shown as raised from 60° F. to 180° F. It will be noted, therefore, that fresh make-up water from the conduit 97 is introduced to the effluent at the point in the heat exchange coil 57 where the temperature of the sewage effluent has already been raised to approximately 130° F. Adding the 130° F. make-up water to the heat exchanger or pasteurizer 56 at a point where the main liquid stream is at or near this temperature increases the mean temperature difference of the heat transfer system and coincident with the pasteurization and sterilization of said make-up fluid, there is a reduction in heat transfer surface over that required if the warm make-up were introduced ahead of the heat exchanger or pasteurizer 56.

Figure 7:
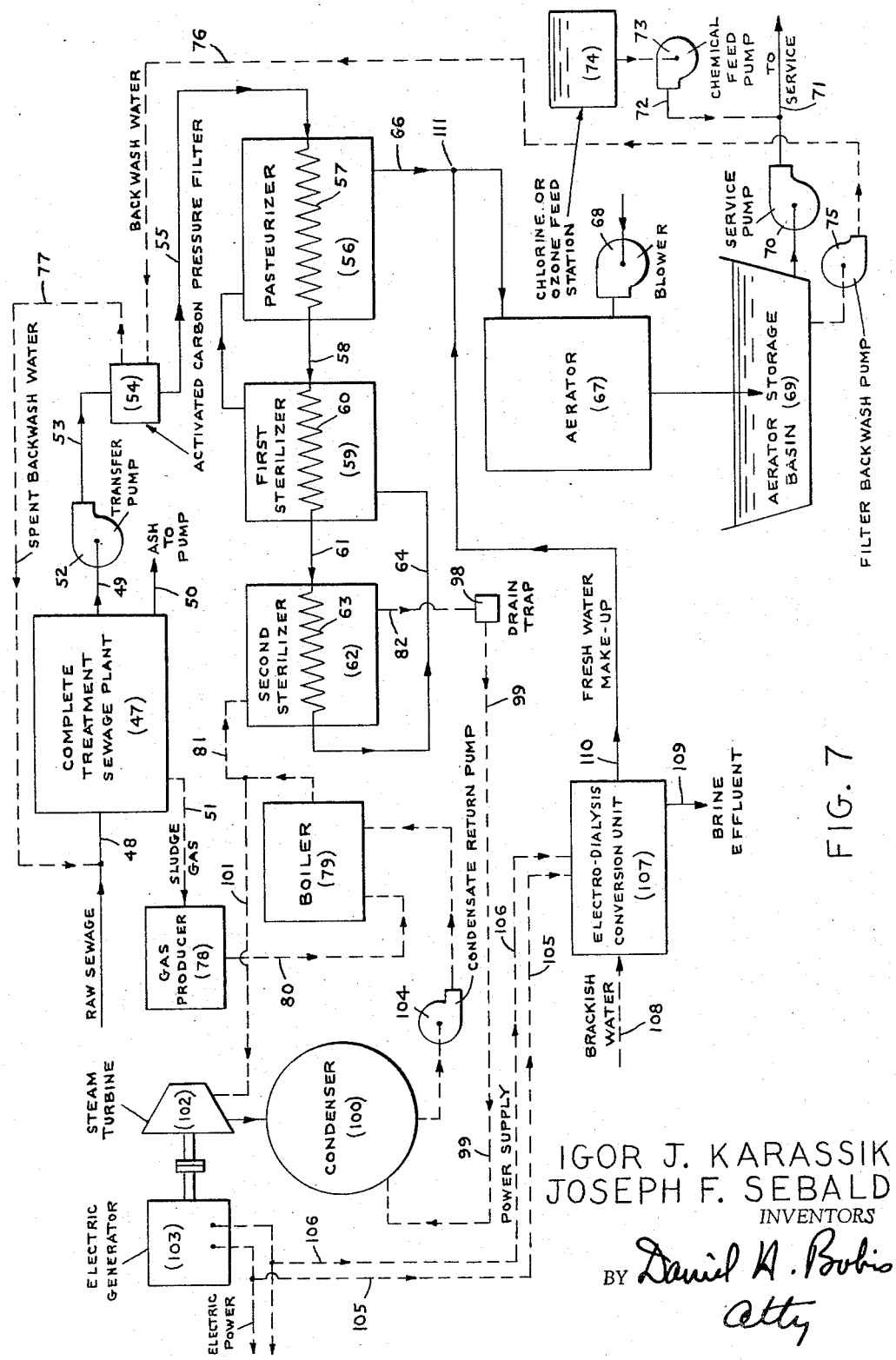
FIGURE 7 is a schematic flow diagram of a further modification of the invention, similar to FIGURE 3, but which involves the combination therewith of an electrodialysis conversion unit.
Figure 14:
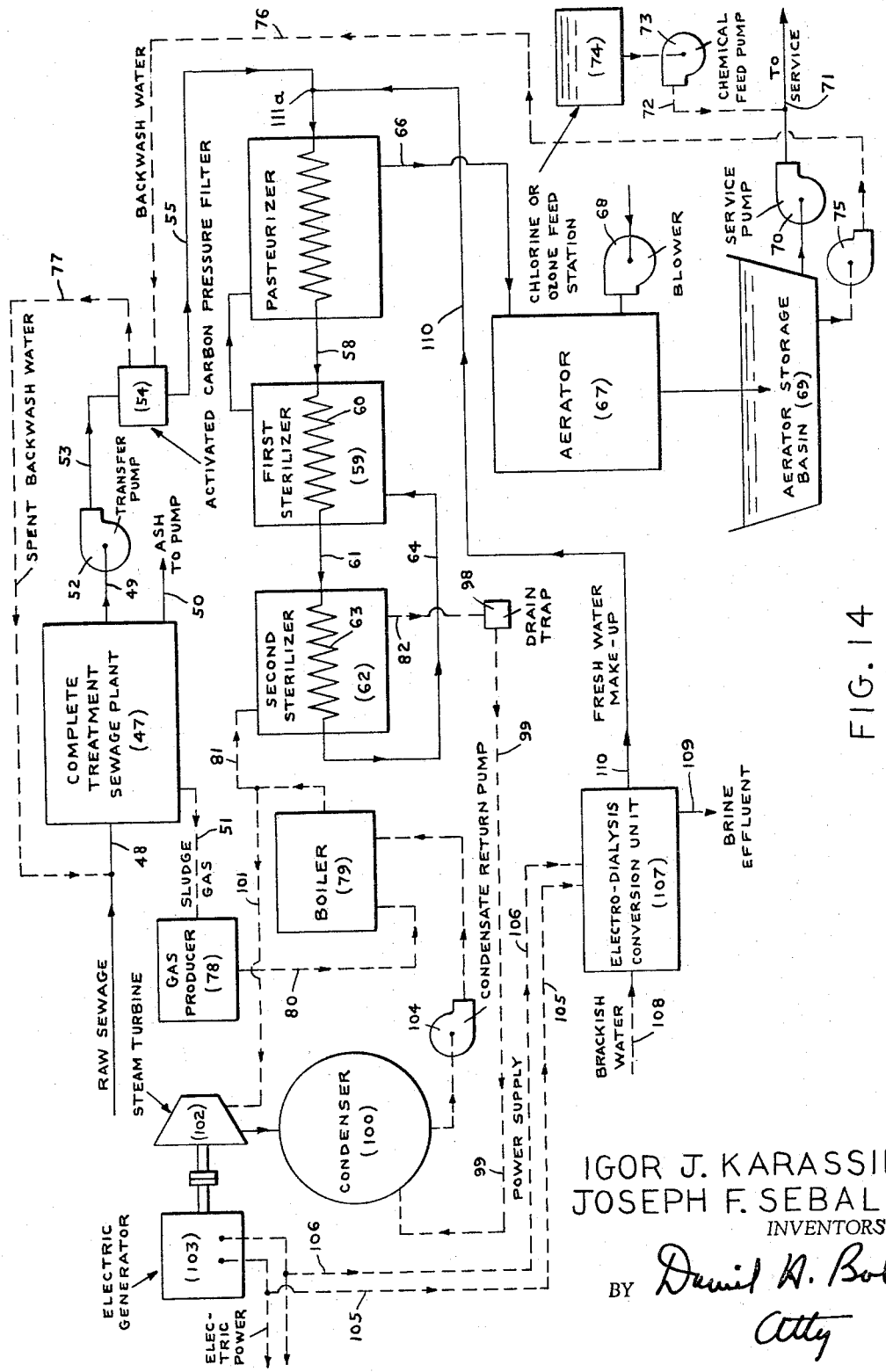
FIGURE 14 is a modification, similar to that of FIGURE 7, but showing a different disposition of the make-up water.

Reference is now made to FIGURE 14, wherein the modification presents a system and apparatus that is very close to that disclosed in detail in FIGURE 7 and described in the specification in the discussion of FIGURE 7. Accordingly, it is not believed necessary to repeat this detailed description. The only change over the disclosure of FIGURE 7, but, again, a highly significant one, is that the fresh make-up water from the electrodialysis conversion unit 107, as it is delivered through conduit 110, does not join the discharge from the shell side of the pasteurizer as in FIGURE 7, but rather it joins the effluent at 111a just prior to its entry into the heat exchange coil 57 of the pasteurizer 56. The reason for this arrangement is that an electrodialysis conversion unit for brackish water or saline water does not eliminate any of the harmful micro-organisms that may be present in the raw water fed to the unit 107. Accordingly, this fresh make-up water is pasteurized and sterilized along with the effluent, and the final discharge is safe for the service 71.

Figure 15:
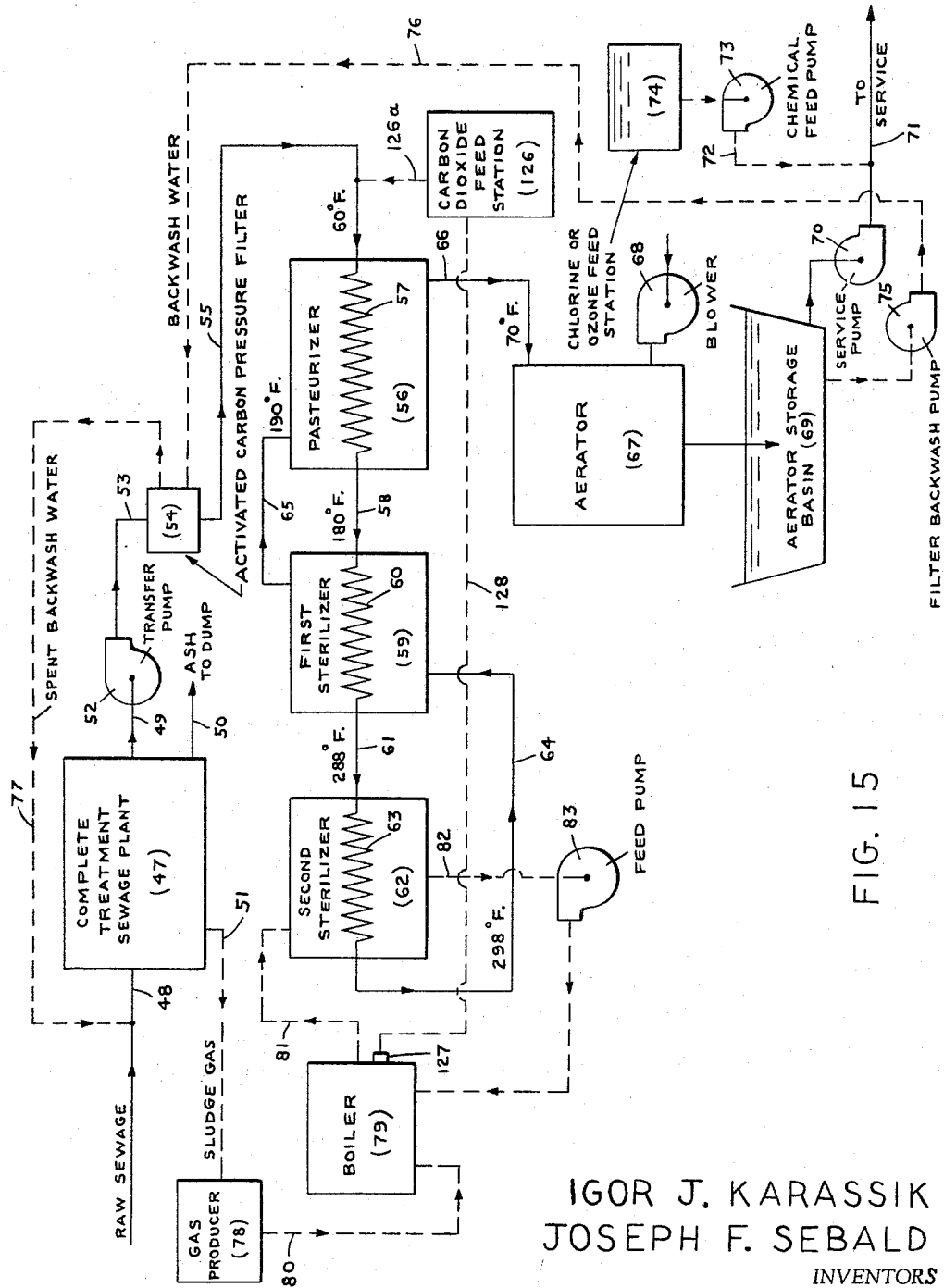
FIGURE 15 is a modification of FIGURE 3, providing for the prevention of boiler scale.

The modification of FIGURE 15 involves a system and apparatus identical with that of FIGURE 3, with the exception of the addition of a carbon dioxide feed means designed to handle the problem of scaling in the heat exchangers. It is believed unnecessary to repeat the full detailed description given in the specification for FIGURE 3, and reference is made to the prior discussion for a full description of FIGURE 15. The addition is in the form of a carbon dioxide feed station 126 which discharges through a conduit 126a into the effluent line 55 leading to the heat exchange coil 57 of the pasteurizer 56. The carbon dioxide feed station 126 may comprise a pressure tank of carbon dioxide gas. In that case, only the tank 126 would be necessary.

It is further contemplated that the products of combustion from the boiler 79, which products would contain a high quantity of carbon dioxide, be taken from the flue discharge 127 through a conduit 128 into the carbon dioxide feed station 126. In this manner, greater efficiency for the entire system would be obtained, since the carbon dioxide generated by combustion in the boiler would normally be a waste product.

The reason why the carbon dioxide feed station 126, or its equivalent, is significant to the method and apparatus is that the thermal processing of surface or well waters in the temperature ranges needed for sterilization may quickly produce scale deposits on the heat transfer surfaces of the heat exchangers and thus quickly reduce the capacity of the pasteurization and sterilization apparatus. Accordingly, the introduction of carbon dioxide from the carbon dioxide feed station 126 into the effluent prior to the heating process provides for the formation of carbonic acid which reduces the scale forming tendency of the water. The feeding of the carbon dioxide gas may be so controlled that the pH level of the effluent may be made consistent with the calcium-magnesium content of the water in relation to the desired temperature of sterilization. The quantity of carbon dioxide needed may easily be determined from a water analysis, and the Langlier Index associated with the water at process temperature.

It is contemplated that a water softening system, chosen from the several well known systems available, may be used in the invention, and this would have substantially the same effect as the use of carbon dioxide gas from the carbon dioxide feed station of FIGURE 15.

Accordingly, attention is directed to FIGURE 16. This modification is very much like FIGURE 3 in all major aspects of the system, with the exception of the addition of a water softening system in the conduit 55 leading from the filter 54 to the heat exchange coil 57 of the pasteurizer 56. Reference is made to the earlier description of FIGURE 3 in the specification for the full details of the system of FIGURE 16, and only the water softening system will be described in detail.

A water softening system 164 is inserted in the conduit 55 which leads to the heat exchange coil 57 of the pasteurizer 56. A by-pass line 165 is arranged to by-pass the water softening system, the by-pass line joining the main effluent conduit at 168. Suitable valves 166 and 167 are provided for suitable control of the by-pass arrangement.

Most water softening systems require rebuilding or regeneration at periodic intervals. Normally, the effluent in the conduit 55 will flow through the water softening system 164 and enter the pasteurizer 56 with scale forming deposits largely removed. If it is necessary to regenerate or rebuild the water softening system, the valve 167 is closed and the valve 166 opened, permitting effluent to by-pass through the by-pass line 165. Accordingly, it is possible to work on the water softening system without shutting down the entire water purification process.

While there have been shown and described herein the preferred embodiments of the invention, it will be understood that minor changes in the process and apparatus may be made without departing from the scope of the invention as disclosed and claimed.

What is claimed is:

1. A purification process for providing a potable water supply from a non-potable source which includes raw sewage, comprising the steps of
   (a) reducing the raw sewage in a complete treatment sewage plant to provide a clear effluent and a sludge gas,
   (b) converting the sludge gas from said complete treatment sewage plant to heat energy,
   (c) using said heat energy for raising said effluent to pasteurizing and sterilizing temperatures and thereby destroying the micro-organism content thereof,
   (d) aerating said sterilized effluent to improve the taste thereof, and
   (e) delivering said sterilized and aerated fluid to a service system.

2. A purification process for providing a potable water supply from a non-potable fluid which includes raw sewage, comprising the steps of
   (a) reducing said raw sewage in a complete treatment sewage plant to provide a clear effluent and sludge gas,
   (b) converting the sludge gas from said complete treatment sewage plant into heat energy,
   (c) using said heat energy for raising said effluent to pasteurizing and sterilizing temperatures and thereby destroying the micro-organism content thereof,
   (d) passing the hot, sterilized effluent in heat exchange relationship with the incoming cold, unsterilized effluent to conserve the heat energy in said sterilized effluent,
   (e) aerating said sterilized effluent to improve the taste thereof, and
   (f) delivering said sterilized and aerated effluent to a service system.

3. A purification process for providing a potable water supply from a non-potable source which includes raw sewage, comprising the steps of
   (a) reducing the raw sewage in a complete treatment sewage plant to provide a clear effluent and sludge gas,
   (b) converting the sludge gas from said complete treatment sewage plant to heat energy,
   (c) using said heat energy for raising said effluent to sterilizing temperatures and thereby destroying the micro-organism content thereof,
   (d) passing the hot, sterilized effluent in heat exchange relationship with the incoming cold, unsterilized effluent to preheat said incoming effluent to pasteurizing temperature,
   (e) aerating said sterilized effluent to improve the taste thereof, and
   (f) delivering said sterilized and aerated effluent to a service system.

4. A purification process for providing a potable water supply from a non-potable source which includes raw sewage, comprising the steps of
   (a) reducing the raw sewage in a complete treatment sewage plant to provide a clear effluent,
   (b) moving said effluent through a pasteurizing step whereby the temperature thereof is raised to at least 180° F.
   (c) moving said effluent through a first sterilizing step, raising the temperature of said effluent to at least 288° F.,
   (d) moving said effluent through a second sterilizing step whereby the temperature thereof is raised to at least 298° F., all micro-organism content in said effluent being thereby destroyed,
   (e) using the hot, sterilized effluent as a heat energy source for the said pasteurizing step and the said first sterilizing step,
   (f) aerating said effluent to improve the taste thereof, and
   (g) delivering said sterilized and aerated effluent to a service system.

5. A purification system for providing a potable water supply from a non-potable source which includes raw sewage, comprising
   (a) an inlet for raw sewage,
   (b) means in the form of a complete treatment sewage plant for reducing said raw sewage to provide a clear effluent and a combustible sludge gas,
   (c) means for combustion of said gas and for converting it into a heat energy source,
   (d) means for passing said effluent in heat exchange relationship with said heat energy source whereby said effluent is raised to sterilizing temperatures, thereby destroying the micro-organism content of said effluent,
   (e) means for receiving and aerating said sterilized effluent, and
   (f) a discharge to a service system.

6. A purification system for providing a potable water supply from a non-potable source which includes raw sewage, comprising
   (a) an inlet for raw sewage,
   (b) means in the form of a complete treatment sewage plant for reducing said raw sewage to provide a clear effluent and a combustible sludge gas,
   (c) means for combustion of said gas and for converting it into a heat energy source,
   (d) a heat exchange means having inner and outer ends,
   (e) said heat exchange means including conduit means for conducting incoming effluent therethrough,
   (f) means at the outer end of said heat exchange means heated by said heat energy source for raising said effluent to sterilizing temperatures whereby the micro-organism content thereof is destroyed,
   (g) means for conducting said hot, sterilized effluent back through said heat exchange means in heat exchange relationship with said incoming effluent,
   (h) means for receiving and aerating said sterilized effluent, and
   (i) a discharge to a service system.

7. A purification system for providing a potable water supply from a non-potable source which includes raw sewage, comprising
   (a) an inlet for raw sewage,
   (b) means in the form of a complete treatment sewage plant for reducing said raw sewage to provide a clear effluent,
   (c) a pasteurizing heat exchanger having means for conducting incoming effluent therethrough,
   (d) a first sterilizing heat exchanger having means for receiving effluent from said pasteurizing heat exchanger and conducting it therethrough,
   (e) a second sterilizing heat exchanger having means for receiving effluent from said first sterilizing heat exchanger and conducting it therethrough and back to the said first sterilizing heat exchanger,
   (f) means for supplying hot effluent to said second sterilizing heat exchanger for raising the said effluent therein to sterilizing temperatures,
   (g) means in said first sterilizing heat exchanger for carrying hot sterilized effluent in heat exchange relationship with said incoming pasteurized effluent,
   (h) means in said pasteurizing heat exchanger for carrying hot, sterilized effluent in heat exchange relationship with said incoming effluent,
   (i) means for receiving cooled, sterilized effluent from said pasteurizer and for aerating it to improve the taste thereof, and
   (j) a discharge to a service system.

8. A purification process for providing a potable water supply from a non-potable fluid which includes raw sewage, comprising the steps of
   (a) reducing said raw sewage in a complete treatment sewage plant to provide a clear effluent and a combustible sludge gas,
   (b) utilizing said sludge gas as a fuel source for a power producing engine to produce work energy and a hot exhaust fluid,
   (c) using said hot exhaust fluid for raising said effluent to pasteurizing and sterilizing temperatures and thereby destroying the micro-organism content thereof,
   (d) using the hot, sterilized effluent to preheat the cold, unsterilized effluent from said plant,
   (e) aerating said sterilized effluent to improve the taste thereof, and
   (f) delivering said sterilized and aerated effluent to a service system.

9. A purification process for providing a potable water supply from a non-potable source which includes raw sewage, comprising the steps of
   (a) reducing said raw sewage in a complete treatment sewage plant to provide a clear effluent and a combustible sludge gas,
   (b) utilizing said sludge gas as a fuel source for a power producing engine to produce work energy and a hot exhaust fluid,
   (c) using said work energy to generate electrical power, said power being used to drive all electrical components involved in the purification process,
   (d) using said hot, exhaust fluid for raising said effluent to pasteurizing and sterilizing temperatures and thereby destroying the micro-organism content thereof,
   (e) using the hot, sterilized effluent to preheat the cold, unsterilized effluent from said plant,
   (f) aerating said sterilized effluent to improve the taste thereof, and
   (g) delivering said sterilized and aerated effluent to a service system.

10. A purification system for providing a potable water supply from a non-potable source which includes raw sewage, comprising
    (a) an inlet for raw sewage,
    (b) means in the form of a complete treatment sewage plant for reducing said raw sewage to provide a clear effluent and a combustible sludge gas,
    (c) a fuel engine for converting said sludge gas into mechanical energy and a hot exhaust,
    (d) means for passing said effluent in heat exchange relationship with said hot exhaust whereby said effluent is raised to sterilizing temperatures, thereby destroying the micro-organism content thereof,
    (e) means for receiving and aerating said sterilized effluent, and
    (f) a discharge to a service system.

11. A purification system for providing a potable water supply from a non-potable source which includes raw sewage, comprising
    (a) an inlet for raw sewage,
    (b) means in the form of a complete treatment sewage plant for reducing said raw sewage to provide a clear effluent and a combustible sludge gas,
    (c) means in the form of a fuel engine for converting said sludge gas into mechanical energy and a hot exhaust,
    (d) means for passing said effluent in heat exchange relationship with said hot exhaust whereby said effluent is raised to sterilizing temperatures, thereby destroying the micro-organism content of said effluent,
    (e) means for passing said hot, sterilized effluent in heat exchange relationship with cold, unsterilized effluent from said plant, thereby conserving heat energy in said hot, sterilized effluent,
    (f) means for receiving and aerating said sterilized effluent, and
    (g) a discharge to a service system.

12. A purfiication process for providing a potable water supply from a non-potable source which includes raw sewage and a separate supply of saline water, comprising the steps of
    (a) reducing the raw sewage in a complete treatment sewage plant to provide a clear effluent and a combustible sludge gas,
    (b) converting said sludge gas to heat energy,
    (c) using a portion of said heat energy for raising said effluent to pasteurizing and sterilizing temperatures, and thereby destroying the micro-organism content thereof,
    (d) using the remainder of said heat energy for converting saline water to fresh make-up water in an evaporating-condensing system,
    (e) combining the effluent and said make-up water, and
    (f) delivering the combined fluids to a service system.

13. A purification process for providing a potable water supply from a non-potable source which includes raw sewage and a separate supply of saline water, comprising the steps of
(a) reducing the raw sewage in a complete treatment sewage plant to provide a clear effluent and a sludge gas,
(b) converting said sludge gas to heat energy,
(c) using a portion of said heat energy for raising said effluent to pasteurizing and sterilizing temperatures and thereby destroying the micro-organism content thereof,
(d) using a further portion of said heat energy for converting saline water to fresh make-up water in an evaporating-condensing system,
(e) using the remainder of said heat energy for converting the brine from said evaporating-condensing system into a usable, concentrated brine effluent, and producing additional fresh make-up water,
(f) combining the fresh make-up water with the sterilized effluent, and
(g) delivering the combined fluids to a service system.

14. A purification system for providing a potable water supply from a non-potable source which includes raw sewage and a separate supply of saline water, comprising
(a) an inlet for raw sewage,
(b) means in the form of a complete treatment sewage plant for reducing said raw sewage to provide a clear effluent and a combustible sludge gas,
(c) means for combustion of said gas and for converting it into a heat energy source,
(d) heat exchange means for passing a portion of said heat energy source in heat exchange relationship with said effluent whereby said effluent is raised to sterilizing temperatures, thereby destroying the micro-organism content thereof,
(e) a saline water intake,
(f) a saline water evaporating-condensing system for receiving said saline water and converting it into fresh make-up water,
(g) means for applying the remainder of said heat energy source for operating said evaporating-condensing system,
(h) means for commingling said fresh make-up water with the sterilized effluent from said heat exchange means, and
(i) means for discharging said commingled fluids to a service system.

15. A purification system for providing a potable water supply from a non-potable source which includes raw sewage and a separate supply of saline water, comprising
(a) an inlet for raw sewage,
(b) means in the form of a complete treatment sewage plant for receiving and reducing said raw sewage to provide a clear effluent and a combustible sludge gas,
(c) means for combustion of said gas and for converting it into a heat energy source,
(d) heat exchange means for passing a portion of said heat energy source in heat exchange relationship with said effluent whereby said effluent is raised to sterilizing temperatures, thereby destroying the micro-organism content thereof,
(e) a saline water intake,
(f) a saline water evaporating-condensing system for receiving said saline water and converting it into fresh make-up water and a brine,
(g) a brine concentrating system for receiving the brine from said evaporating-condensing system, said system providing concentrated brine and additional fresh make-up water,
(h) means for applying the remainder of said heat energy source to the operation of said evaporating-condensing system and said brine concentrating system,
(i) means for commingling the said fresh make-up water with the sterilized effluent from said heat exchange means, and
(j) means for discharging said commingled fluids to a service system.

16. A purification process for providing a potable water supply from a non-potable source which includes raw sewage and a separate supply of brackish water, comprising the steps of
(a) reducing the raw sewage in a complete treatment sewage plant to provide a clear effluent and a combustible sludge gas,
(b) converting said sludge gas to heat energy,
(c) using a portion of said heat energy for raising said effluent to pasteurizing and sterilizing temperatures and thereby destroying the micro-organism content thereof,
(d) converting the remainder of said heat energy into electrical energy,
(e) using said electrical energy to convert brackish water into fresh make-up water in an electrodialysis conversion unit,
(f) commingling said fresh make-up water with the sterilized effluent, and
(g) delivering said commingled effluent and fresh make-up water to a service system.

17. A purification system for providing a potable water supply from a non-potable source which includes raw sewage and a separate supply of brackish water, comprising
(a) an inlet for raw sewage,
(b) means in the form of a complete treatment sewage plant for reducing said raw sewage to provide a clear effluent and a combustible sludge gas,
(c) means for combustion of said gas and for converting it into a hot fluid,
(d) heat exchange means for receiving and passing a portion of said hot fluid in heat exchange relationship with said effluent, whereby said effluent is raised to sterilizing temperatures, thereby destroying the micro-organism content thereof,
(e) a heat engine receiving the remainder of said hot fluid to develop mechanical power,
(f) an electrical generator driven by said heat engine,
(g) an inlet for brackish water,
(h) means including an electrodialysis conversion unit for receiving said brackish water and converting it into fresh make-up water, said unit being powered by the electrical energy from said generator,
(i) means for receiving and commingling said sterilized effluent and said make-up water, and
(j) means for discharging said commingled fluids to a service system.

18. A purification process for providing a potable water supply from a non-potable source which includes raw sewage comprising the steps of
(a) reducing the raw sewage in a complete treatment sewage plant to provide a clear effluent and a combustible sludge gas,
(b) converting said sludge gas to heat energy by the combustion thereof,
(c) using said heat energy in raising said effluent to pasteurizing and sterilizing temperatures, thereby destroying the micro-organism content thereof,
(d) aerating said effluent to improve the taste thereof,
(e) removing the contaminating solids from said effluent which cannot be broken down and removed in the complete treatment sewage plant, and
(f) delivering said effluent to a service system.

19. A purification system for providing a potable water supply from a non-potable source which includes raw sewage, comprising
(a) a raw sewage inlet,
(b) means in the form of a complete treatment sewage plant for reducing said raw sewage to provide a clear effluent and a combustible sludge gas,
(c) means for combustion of said sludge gas to convert it into a heat energy source, (d) heat exchange means for receiving said effluent and passing it in indirect heat exchange relationship with said heat energy source to raise said effluent to pasteurizing and sterilizing temperatures and thereby destroying the micro-organism content thereof,
(e) means for aerating said effluent to improve the taste thereof,
(f) means for removing contaminating solids from said aerated effluent which cannot be broken down and removed in the complete treatment sewage plant, and
(g) means for delivering said effluent to a service system.

20. A purification system for providing a potable water supply from a non-potable source which includes raw sewage comprising
(a) a raw sewage inlet,
(b) means in the form of a complete treatment sewage plant for receiving and reducing raw sewage to provide a clear effluent and a combustible sludge gas,
(c) a boiler having a heat exchange coil therein,
(d) means for conducting sludge gas from said plant to said boiler for combustion therein,
(e) a heat exchanger,
(f) means to conduct said effluent from said plant through said heat exchanger to the heat exchange coil in said boiler,
(g) means to conduct hot, sterilized effluent from said heat exchange coil through said heat exchanger in indirect heat exchange relationship with said incoming effluent,
(h) means to aerate the sterilized effluent received from said heat exchanger, and
(i) means to deliver said effluent to a service system.

21. A purification process for providing a potable water supply from a non-potable source which includes raw sewage and a separate supply of saline water, comprising the steps of
(a) reducing the raw sewage in a complete treatment sewage plant to provide a clear effluent and a combustible sludge gas,
(b) converting said sludge gas to heat energy,
(c) using a portion of said heat energy for converting saline water to fresh make-up water in an evaporating-condensing system,
(d) combining said fresh make-up water with said clear effluent,
(e) using the remainder of said heat energy for raising said combined effluent and fresh make-up water to pasteurizing and sterilizing temperatures, thereby destroying the micro-organism content thereof, and
(f) delivering said combined pasteurized and sterilized effluent and fresh make-up water to a service system.

22. A purification process for providing a potable water supply from a non-potable source which includes raw sewage and a separate supply of saline water, comprising the steps of
(a) reducing the raw sewage in a complete treatment sewage plant to provide a clear effluent and a combustible sludge gas,
(b) converting said sludge gas to heat energy,
(c) using a portion of said energy for raising said effluent from ambient temperature through pasteurizing and sterilizing temperature, thereby destroying the micro-organism content thereof,
(d) using the remainder of said energy for converting saline water to fresh make-up water in an evaporating condensing system wherein the temperature of said water is elevated relative to its ambient temperature,
(e) combining said fresh-make-up water at its elevated temperature with said effluent as it is being raised from ambient to pasteurizing temperatures, the effluent and make-up water being combined at substantially the same temperatures, the said make-up water also being raised to pasteurizing and sterilizing temperatures along with said effluent for destroying the micro-organism content thereof, and
(f) delivering said combined pasteurized and sterilized effluent and make-up water to a service system.

23. A purification system for providing a potable water supply from a non-potable source which includes raw sewage and a separate supply of saline water, comprising
(a) an inlet for raw sewage,
(b) means in the form of a complete treatment sewage plant for reducing said raw sewage to provide a clear effluent and a combustible sludge gas,
(c) means for combustion of said gas and for converting it into a heat energy source,
(d) heat exchange means for passing said effluent therethrough in heat exchange relationship with a portion of said heat energy, whereby said effluent is raised to pasteurizing and sterilizing temperatures, thereby destroying the micro-organism content thereof,
(e) a saline water intake,
(f) a saline water evaporating-condensing system for receiving said saline water and converting it into fresh make-up water,
(g) means for applying the remainder of said heat energy for operating said evaporating-condensing system,
(h) means for commingling said fresh make-up water with said effluent as it is passing through said heat exchange means, and
(i) means for discharging said commingled pasteurized and sterilized effluent and make-up water to a service system.

24. A purification process for providing a potable water supply from a non-potable source which includes raw sewage and a separate supply of brackish water, comprising the steps of
(a) reducing the raw sewage in a complete treatment sewage plant to provide a clear effluent and a combustible sludge gas,
(b) converting said sludge gas to heat energy,
(c) using a portion of said heat energy for raising said effluent from ambient temperatures to pasteurizing and sterilizing temperatures and thereby destroying the micro-organism content thereof,
(d) converting the remainder of said heat energy into electrical energy,
(e) using said electrical energy to convert brackish water into fresh make-up water in an electrodialysis conversion unit,
(f) commingling said fresh make-up water with said effluent while it is at ambient temperatures before it is raised to pasteurizing and sterilizing temperatures, the said make-up water also being raised to sterilizing temperatures, thereby destroying the micro-organism content thereof, and
(g) delivering said combined pasteurized and sterilized effluent and fresh make-up water to a service system.

25. A purification system for providing a potable water supply from a non-potable source which includes raw sewage and a separate supply of brackish water, comprising
(a) an inlet for raw sewage,
(b) means in the form of a complete treatment sewage plant for reducing said raw sewage to provide a clear effluent and a combustible sludge gas,
(c) means for combustion of said gas and for converting it into a hot fluid,
(d) heat exchange means for receiving and passing a portion of said hot fluid in heat exchange relationship with said effluent, whereby said effluent is raised to sterilizing temperatures, thereby destroying the micro-organism content thereof,
(e) a heat engine receiving the remainder of said hot fluid to develop mechanical power,
(f) an electrical generator driven by said heat engine,
(g) an inlet for brackish water, (h) means including an electrodialysis conversion unit for receiving said brackish water and converting it into fresh make-up water, said unit being powered by the electrical energy from said generator,
(i) means for commingling said fresh make-up water with said effluent prior to its passage into said heat exchange means, whereby said make-up water is also raised to sterilizing temperatures, and
(j) means for discharging said sterilized and commingled make-up water and effluent to a service system.

26. A purification process for providing a potable water supply from a non-potable source which includes raw sewage, comprising the steps of
   (a) reducing the raw sewage in a complete treatment sewage plant to provide a clear effluent and a sludge gas,
   (b) converting the sludge gas to heat energy by combustion of said gas,
   (c) subjecting said effluent to a water softening process to remove scale forming components therein,
   (d) using said heat energy for raising said effluent to pasteurizing and sterilizing temperatures and thereby destroying the micro-organism content thereof, and
   (e) delivering said sterilized fluid to a service system.

27. The process of claim 26, wherein said water softening process comprises an injection of carbon dioxide into the effluent.

28. The process of claim 26, wherein said water softening process comprises an injection of carbon dioxide into the effluent, at least part of said carbon dioxide being derived from the products of combustion of said sludge gas.

29. A purification system for providing a potable water supply from a non-potable source which includes raw sewage, comprising
   (a) an inlet for raw sewage,
   (b) a complete treatment sewage plant means for receiving and reducing said raw sewage to provide a clear effluent and a combustible sludge gas,
   (c) means for combustion of said gas and for converting it into a heat energy source,
   (d) heat exchange means for receiving said effluent from said complete treatment sewage plant means and for passing it in heat exchange relationship with said heat energy and raising it to sterilizing temperatures whereby the micro-organism content thereof is destroyed,
   (e) water softening means interposed between said complete treatment sewage plant and said heat exchange means for removing scale forming components from said effluent prior to entry of said effluent into said heat exchange means, said water softening means including a means to inject carbon dioxide into said effluent,
   (f) means for conducting carbon dioxide gas formed by combustion from said gas combustion means to said injection means, and
   (g) means for receiving said sterilized effluent and delivering it to a service system.

References Cited by the Examiner

UNITED STATES PATENTS

| | | | |
|---|---|---|---|
| 792,426 | 6/1905 | Knodler | 202—203 X |
| 2,938,630 | 5/1960 | Novak | 210—15 X |

FOREIGN PATENTS 13,758   1891   Great Britain.

OTHER REFERENCES

Babbitt,, H. E.: Sewerage and Sewage Treatment, sixth edition, 1947, John Wiley and Sons, New York, pp. 399, 400, 452, 453, 517–519 and 564.

Betz Handbook of Industrial Water Conditioning, fifth edition, 1958, Betz Laboratories, Inc., Philadelphia 24, Pa., pp. 15, 30, 44, 45, 104, 112–116, 159 and 162–164.

Summary Report: The Advanced Waste Treatment Research Program, June 1960–December 1961, Booklet SEC TR W62–9 of the U.S. Dept. of Health, Education, and Welfare, Public Health Service, Robert A. Taft Sanitary Engineering Center, Cincinnati, Ohio, dated May 1962, pp. 20–25 relied on.

MORRIS O. WOLK, *Primary Examiner.*

MICHAEL E. ROGERS, *Examiner.*